US009448518B2

(12) United States Patent
Atsumi et al.

(10) Patent No.: US 9,448,518 B2
(45) Date of Patent: Sep. 20, 2016

(54) IMAGE PROCESSING APPARATUS WITH DISPLAY UNIT

(75) Inventors: Tomoyuki Atsumi, Toyohashi (JP); Kaoru Fukuoka, Toyokawa (JP); Shin Ohba, Kokubunji (JP); Eiichi Narimatu, Toyokawa (JP)

(73) Assignee: Konica Minolta Businss Technologies, Inc., Chiyoda-ku, Tokyo (JP)

( * ) Notice: Subject to any disclaimer, the term of this patent is extended or adjusted under 35 U.S.C. 154(b) by 88 days.

(21) Appl. No.: 13/549,619

(22) Filed: Jul. 16, 2012

(65) Prior Publication Data

US 2013/0021633 A1 Jan. 24, 2013

(30) Foreign Application Priority Data

Jul. 19, 2011 (JP) .................................. 2011-157946

(51) Int. Cl.
*G03G 15/00* (2006.01)
*H04N 1/00* (2006.01)
*H04N 1/60* (2006.01)

(52) U.S. Cl.
CPC ........ *G03G 15/502* (2013.01); *H04N 1/00005* (2013.01); *H04N 1/0005* (2013.01); *H04N 1/00037* (2013.01); *H04N 1/0044* (2013.01); *H04N 1/00045* (2013.01); *H04N 1/00076* (2013.01); *H04N 1/00413* (2013.01); *H04N 1/6011* (2013.01); *H04N 1/00384* (2013.01); *H04N 1/00411* (2013.01); *H04N 2201/0094* (2013.01)

(58) Field of Classification Search
CPC ........... G03G 15/502; H04N 1/00005; H04N 1/00034; H04N 1/00045; H04N 1/00413
See application file for complete search history.

(56) References Cited

U.S. PATENT DOCUMENTS

| 5,422,743 | A | * | 6/1995 | Farrell et al. ................. 358/537 |
| 2006/0033967 | A1 | | 2/2006 | Brunner |
| 2008/0204778 | A1 | | 8/2008 | Koarai |
| 2009/0213409 | A1 | | 8/2009 | Arifuku et al. |
| 2009/0225202 | A1 | * | 9/2009 | Hata .............................. 348/241 |
| 2009/0265625 | A1 | | 10/2009 | Tamai et al. |
| 2010/0107064 | A1 | | 4/2010 | Yamaguchi et al. |

FOREIGN PATENT DOCUMENTS

| CN | 1734469 A | 2/2006 |
| JP | 2002-247388 A | 8/2002 |

(Continued)

OTHER PUBLICATIONS

Chinese First Office Action dated Jun. 13, 2014 issued in the corresponding Chinese Patent Application No. 201210251155.3 and English language translation (16 pages).
Office Action (Notification of Reasons for Refusal) issued on Dec. 3, 2013, by the Japan Patent Office in corresponding Japanese Patent Application No. 2011-157946, and an English Translation of the Office Action. (6 pages).

(Continued)

*Primary Examiner* — Mohammad Ghayour
*Assistant Examiner* — Lennin Rodriguezgonzale
(74) *Attorney, Agent, or Firm* — Buchanan Ingersoll & Rooney PC

(57) ABSTRACT

An image forming apparatus includes an operation panel to preview an image page by page. The image forming apparatus stores a feature of an image of a page previewed on the operation panel and extracts a regularity from the stored feature of the image. When a feature of an image of a page previewed on the operation panel does not agree with the extracted regularity, the image forming apparatus displays a menu for correcting the feature that does not agree.

18 Claims, 21 Drawing Sheets

(56) References Cited

FOREIGN PATENT DOCUMENTS

| | | |
|---|---|---|
| JP | 2006-19904 A | 1/2006 |
| JP | 2006-180044 A | 7/2006 |
| JP | 2008-210160 A | 9/2008 |
| JP | 2009-206678 A | 9/2009 |
| JP | 2009-260696 A | 11/2009 |
| JP | 2010-2638 A | 1/2010 |
| JP | 2010-109419 A | 5/2010 |

OTHER PUBLICATIONS

Office Action (Notification of Reasons for Refusal) issued on Mar. 18, 2014, by the Japan Patent Office in corresponding Japanese Patent Application No. 2011-157946, and an English Translation of the Office Action. (5 pages).

Japanese Office Action (Notice of Grounds of Rejection) dated Dec. 3, 2013, issued by the Japanese Patent Office in corresponding Japanese Patent Application No. 2011-157946, and English language translation of Office Action. (7 pages).

* cited by examiner

FIG.5

PREVIEW FEATURE INFORMATION X

| PAGE | FEATURE(0) COLOR | FEATURE(1) ORIENTATION | FEATURE(2) DENSITY | FEATURE(3) PAGE NUMBER | FEATURE(4) .... |
|---|---|---|---|---|---|
| 1 | COLOR | UPWARD | 5 | 1 | |
| 2 | COLOR | DOWNWARD | 5 | 2 | |
| 3 | COLOR | UPWARD | 4 | 3 | |
| 4 | BLACK | DOWNWARD | 6 | 4 | |
| 5 | COLOR | UPWARD | 4 | 5 | |
| ⋮ | ⋮ | ⋮ | ⋮ | ⋮ | |

FIG.6

PREVIEW FEATURE INFORMATION Y

| PAGE | FEATURE(0) COLOR | FEATURE(1) ORIENTATION | FEATURE(2) DENSITY | FEATURE(3) PAGE NUMBER | FEATURE(4) · · · · |
|---|---|---|---|---|---|
| 1 | COLOR | UPWARD | 5 | 1 | |
| 2 | COLOR | DOWNWARD | 5 | 2 | |
| 3 | – | – | – | – | |
| 4 | BLACK | DOWNWARD | 6 | 4 | |
| 5 | COLOR | UPWARD | 4 | 5 | |
| ⋮ | ⋮ | ⋮ | ⋮ | ⋮ | |

FIG.10

FEATURE DEFINITION TABLE

| NUMBER(n) | NAME OF FEATURE | CHARACTERISTIC OF FEATURE |
|---|---|---|
| 0 | COLOR | QUALITATIVE VALUE |
| 1 | ORIENTATION | QUALITATIVE VALUE |
| 2 | DENSITY | QUANTATIVE VALUE |
| 3 | PAGE NUMBER | CONSECUTIVE VALUE |
| ⋮ | ⋮ | ⋮ |

FIG.13

FILTER FOR EXTRACTING REGULARITY FROM QUALITATIVE VALUES

| NUMBER(m) | CONTENT OF FILTER |
|---|---|
| 0 | ALL PAGES HAVE SAME VALUE |
| 1 | CONSECUTIVE TWO PAGES HAVE SAME VALUE |
| 2 | CONSECUTIVE FOUR PAGES HAVE SAME VALUE |
| 3 | CONSECUTIVE EIGHT PAGES HAVE SAME VALUE |
| 4 | EVERY TWO PAGES HAVE SAME VALUE |
| 5 | EVERY FOUR PAGES HAVE SAME VALUE |
| 6 | EVERY EIGHT PAGES HAVE SAME VALUE |

FIG.16

FILTER FOR EXTRACTING REGULARITY FROM NUMERIAL VALUES

| NUMBER(k) | CONTENT OF FILTER |
|---|---|
| 0 | EVERY ONE PAGE HAS SAME VALUE |
| 1 | EVERY TWO PAGES HAVE SAME VALUE |
| 2 | EVERY FOUR PAGES HAVE SAME VALUE |
| 3 | EVERY EIGHT PAGES HAVE SAME VALUE |

IMAGE PROCESSING APPARATUS WITH DISPLAY UNIT

This application is based on Japanese Patent Application No. 2011-157946 filed with the Japan Patent Office on Jul. 19, 2011, the entire content of which is hereby incorporated by reference.

BACKGROUND OF THE INVENTION

1. Field of the Invention

The present invention relates to an image processing apparatus with a display unit, and more particularly to an image processing apparatus that previews images page by page.

2. Description of the Related Art

Electrophotographic image forming apparatuses include, for example, an MFP (Multi-Function Peripheral) having scanner, facsimile, copy, printer, data communication, and server functions, a facsimile machine, a copier, and a printer.

A conventional image forming apparatus has a preview function for displaying an image to be printed on an operation panel of the image forming apparatus. The preview function allows the user to check the finished state of the printout in advance.

A conventional image forming apparatus additionally has a function of accepting the setting of a mode from the user during preview and correcting a preview image in accordance with the set mode. The modes that can be set by the user include, for example, correction of an image density, page replacement, change of an image orientation, and the like. Accordingly, when a preview image includes an error, the user can set a necessary mode that affects the preview image thereby preventing a miscopy.

Here, the following Documents 1 to 5 disclose techniques concerning a method of operating an image forming apparatus during preview. Document 1 discloses a technique in which a button for transition to a setting window for inserted paper setting, page deletion, or document insertion is displayed on a preview screen, and editing on the previewed page is accepted when the button is pressed. Document 2 discloses a technique in which thumbnail data of an original image is created, and designation of the inserted position of inserted paper is accepted from the thumbnail data of the previewed original image. Document 3 discloses a technique in which the user is prompted to change the mode to a monochrome mode when printing only in black and white continues for a certain time or longer when color/monochrome automatic switching is being selected. Document 4 discloses a technique in which when duplex print is set, only an image of an odd-numbered page or an even-numbered page can be designated for preview. Document 5 discloses a technique in which when an exceptional page such as a blank page is detected from images input to an image processing apparatus, that page is displayed on a display to allow the user to determine whether the page is required or not.

Document 1: Japanese Laid-Open Patent Publication No. 2006-180044
Document 2: Japanese Laid-Open Patent Publication No. 2006-19904
Document 3: Japanese Laid-Open Patent Publication No. 2010-2638
Document 4: Japanese Laid-Open Patent Publication No. 2009-260696
Document 5: Japanese Laid-Open Patent Publication No. 2009-206678

In recent years, image forming apparatuses, in particular, MFPs have a number of modes (functions) that can be set. In order to allow selection from these modes during preview, a conventional image forming apparatus displays a number of mode setting keys on the screen of the operation panel, or displays the mode settings divided into appropriate groups on the screen of the operation panel and successively switches the groups to allow the user to select a desired mode therefrom. Then, during preview, if the user finds a mistake in scanning an original or a mistake made when an original is created, the user has to find the desired mode from a number of modes. Therefore, the operation is cumbersome and the convenience of the image forming apparatus is low.

For example, when the user checks a preview image for each page while manually turning pages on a preview screen and finds a page with a low density among the preview images, the user has to find and set the mode for setting density from among a number of modes.

The techniques according to Documents 1 to 5 cannot solve this problem.

SUMMARY OF THE INVENTION

An object of the present invention is to provide a convenient image processing apparatus.

According to an aspect of the present invention, an image processing apparatus with a display unit includes: a preview unit for previewing an image page by page on the display unit; a feature extraction unit for extracting a feature of an image; a feature storage unit for storing a feature of an image of a page previewed on the display unit; a regularity extraction unit for extracting a regularity from the feature of the image stored by the feature storage unit; and a correction menu display unit for displaying a menu for correcting a feature that does not agree if a feature of an image of a page previewed on the display unit does not agree with the regularity extracted by the regularity extraction unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram schematically showing preview feature information X stored in an HDD.

FIG. 6 is a diagram schematically showing preview feature information Y stored in the HDD.

FIG. 10 is a diagram schematically showing a feature definition table stored in the HDD.

FIG. 13 is a diagram schematically showing a filter for extracting a regularity from qualitative values.

FIG. 16 is a diagram schematically showing a filter for extracting a regularity from numerical values.

DESCRIPTION OF THE PREFERRED EMBODIMENTS

Embodiments of the present invention will be described below based on the figures.

In the present embodiment, an image processing apparatus is an image forming apparatus that performs image forming by an electrophotographic technique or an electrostatic technique, by way of example. The image forming apparatus in the present embodiment may be an MFP having scanner, facsimile, copy, printer, data communication, and server functions, a facsimile machine, a copier, a printer, or the like. The image processing apparatus may be any other device such as a PC (Personal Computer), a portable terminal device, or a camera.

[Configuration of Image Forming Apparatus]

First of all, a configuration of the image forming apparatus will be described.

Figure 1:
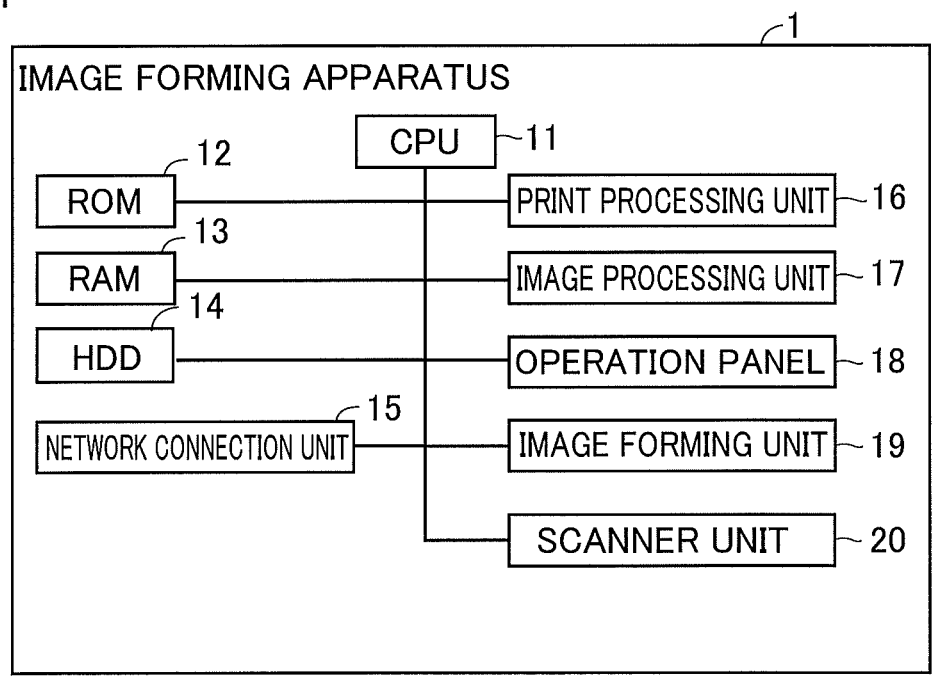
FIG. 1 is a block diagram showing a configuration of an image forming apparatus according to an embodiment of the present invention.

Referring to FIG. 1, an image forming apparatus 1 is, for example, an MFP configured to include a CPU (Central Processing Unit) 11, a ROM (Read Only Memory) 12, a RAM (Random Access Memory) 13, an HDD (Hard Disk Drive) 14, a network connection unit 15, a print processing unit 16, an image processing unit 17, an operation panel 18, an image forming unit 19, and a scanner unit 20.

CPU 11 performs control of the entire image forming apparatus 1 for a variety of jobs such as a scan job, a copy job, a mail transmission job, and a print job. CPU 11 executes a control program stored in ROM 12. CPU 11 performs a prescribed process to read data from RAM 12 or ROM 13 or write data into RAM 12 or ROM 13.

ROM 12 is a main memory of CPU 11. RAM 12 is used to store data necessary for CPU 11 to execute a control program.

RAM 13 temporarily stores image data and data necessary for CPU 11 to bring a program into operation.

HDD 14 is a storage device to store print data sent from the outside through network connection unit 15 or image data scanned by scanner unit 20. HDD 14 additionally stores preview feature information X (FIG. 5), preview feature information Y (FIG. 6), a filter for extracting a regularity (FIG. 13 and FIG. 16), and the like.

Network connection unit 15 performs communication with external equipment via a LAN or the like with a communication protocol such as TCP/IP in accordance with an instruction from CPU 11.

Print processing unit 16 performs a process of printing an original image.

Image processing unit 17 performs adjustment of a character width and conversion of contrast or color of image data.

Operation panel 18 is an interface for accepting an operation of image forming apparatus 1 from the user and displaying various information to the user.

Image forming unit 19 is configured to mainly include a toner image forming unit, a fixing device, and a paper conveyance unit. Image forming unit 19 forms an image on paper, for example, by an electrophotographic technique. The toner image forming unit is configured to be able to combine images of four colors in a tandem manner and form a color image on paper (recording medium). The toner image forming unit is configured to include photoconductors for C (cyan), M (magenta), Y (yellow), and K (black), an intermediate transfer belt to which a toner image is transferred from the photoconductor (primary transfer), and a transfer unit for transferring an image from the intermediate transfer belt onto paper (secondary transfer). The fixing device has a heating roller and a pressing roller. The fixing device conveys paper with a toner image sandwiched between the heating roller and the pressing roller to heat and press the paper. Accordingly, the fixing device fuses toner adhered to the paper to fix the toner on the paper thereby forming an image on the paper. The paper conveyance unit is configured to include a paper feed roller, a conveyance roller, and a motor for driving them. The paper conveyance unit feeds paper from a paper feed cassette and conveys the paper in the inside of the casing of image forming apparatus 1. The paper conveyance unit outputs paper having an image formed thereon from the casing of image forming apparatus 1 to an output tray or the like.

Scanner unit 20 scans an original image and converts the scanned image into image data which is electronic data.

Image forming apparatus 1 in the present embodiment extracts features of images to be previewed and successively previews images page by page on operation panel 18. Image forming apparatus 1 then stores the features of the images of the previewed pages and extracts a regularity from the stored features of the images. When the feature of an image of a page previewed on operation panel 18 does not agree with the extracted regularity, image forming apparatus 1 displays a correction menu for correcting the feature that does not agree.

[Preview Method of Image Forming Apparatus]

A preview method of the image forming apparatus according to the present embodiment will now be described.

Figure 2:
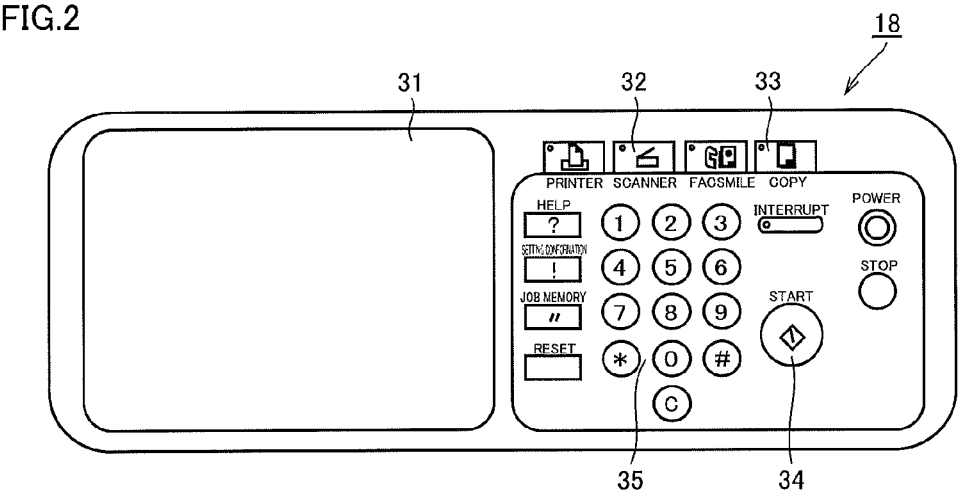
FIG. 2 is a diagram schematically showing a configuration of an operation panel shown in FIG. 1.

FIG. 2 is a diagram schematically showing a configuration of the operation panel shown in FIG. 1.

Referring to FIG. 2, operation panel 18 mainly includes a touch panel 31 for displaying a variety of setting items, a preview image, or a message and accepting a variety of settings from the user, a scanner key 32 pressed when the scanner function of image forming apparatus 1 is selected, a copy key 33 pressed when the copy function of image forming apparatus 1 is selected, a start key 34 for accepting an instruction to execute a job of each function, and a ten-key pad 35 for accepting input of numerical values.

Figure 3:
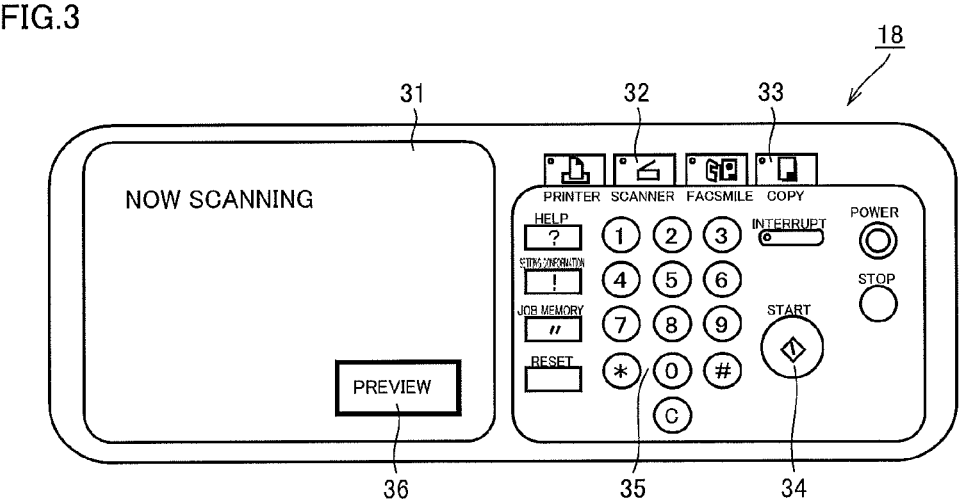
FIG. 3 is a diagram schematically showing a display state of the operation panel in a case where a scanner unit is scanning an original image.

FIG. 3 is a diagram schematically showing a display state of the operation panel in a case where the scanner unit is scanning an original image.

Referring to FIG. 3, when start key 34 is pressed with the scanner function or the copy function being selected on operation panel 18, image forming apparatus 1 executes a scan job or a copy job. Image forming apparatus 1 uses scanner unit 20 to scan an image of an original document loaded in an ADF (Automatic Document Feeder) and stores the scanned image, for example, into HDD 14. Image forming apparatus 1 then extracts a feature of the image stored in HDD 14 and stores the extracted feature as preview feature information X (FIG. 5) into HDD 14. While an original image is being scanned, for example, a message "now scanning" and a preview key 36 appear on touch panel 31 of operation panel 18.

Even after all the original images are scanned, image forming apparatus 1 may continue displaying preview key 36 until start key 34 is pressed for print execution.

Figure 4:
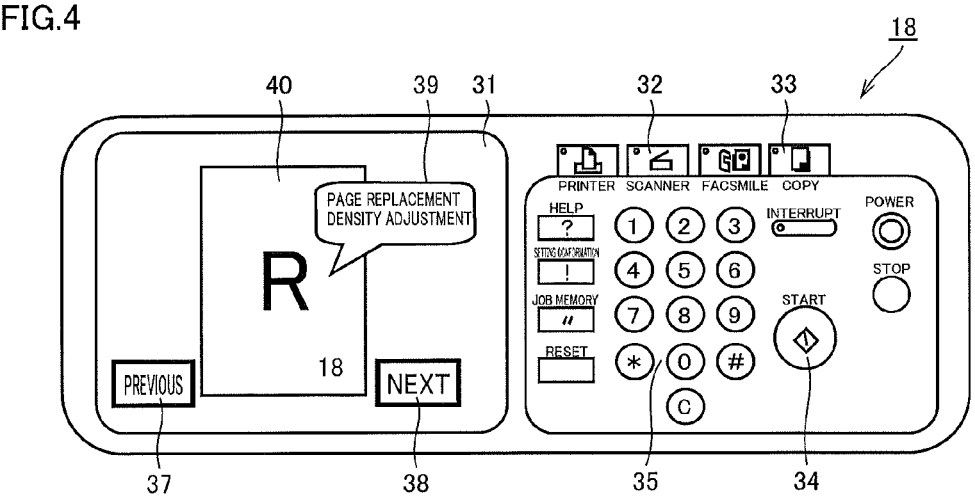
FIG. 4 is a diagram schematically showing a display state of the operation panel in a case where a preview button is pressed.

FIG. 4 is a diagram schematically showing a display state of the operation panel in a case where the preview button is pressed.

Referring to FIG. 4, when preview key 36 is pressed in FIG. 3, image forming apparatus 1 displays a preview image page by page on touch panel 31. A preview image 40, a previous page key 37, and a next page key 38 are displayed on touch panel 31.

When previous page key 37 is pressed in the display state shown in FIG. 4, image forming apparatus 1 changes preview image 40 to an image of a page previous to the currently displayed page. When next page key 38 is pressed in the display state shown in FIG. 4, image forming apparatus 1 changes preview image 40 to an image of a page subsequent to the currently displayed page. The user can examine images while successively moving pages by pressing previous page key 37 or next page key 38 and can allow a desired page to be previewed.

When there is no page that applies, previous page key 37 and next page key 38 may not be displayed.

When neither previous page key 37 nor next page key 38 is pressed and the same page is continuously displayed for a first period of time in the display state shown in FIG. 4, image forming apparatus 1 assumes that the user fully recognizes the feature of the original image based on the preview image and determines that there is no error in the image. In this case, image forming apparatus 1 validates the feature of the image of the currently displayed page.

On the other hand, when the preview image is changed to an image of another page before the first period of time has passed, image forming apparatus 1 assumes that the user does not fully recognize the preview image. In this case, image forming apparatus 1 does not validate the feature of the image of the currently displayed page.

When neither previous page 37 nor next page key 38 is pressed and the same page is continuously displayed for a second period of time in the display state shown in FIG. 4, image forming apparatus 1 determines that the user wishes to set a mode (make a correction) for the image kept being displayed. In this case, image forming apparatus 1 extracts the validated features of images of the pages displayed so far (from the page initially displayed to the page displayed prior to the currently displayed page) and stores the extracted features as preview feature information Y (FIG. 6) into HDD 14. Image forming apparatus 1 then extracts a regularity from the features registered in the preview feature information Y. A method of extracting a regularity will be described later.

It is noted that the first period of time may be longer than the second period of time or may be shorter than the second period of time.

Subsequently, image forming apparatus 1 determines whether the feature of the image of the currently displayed page agrees with the extracted regularity. Then, if a feature that does not agree is found, image forming apparatus 1 displays a correction menu 39 for correcting that feature on touch panel 31, together with preview image 40. In FIG. 4, as correction menu 39, a "page replacement" mode and a "density adjustment mode" are displayed in the vicinity of preview image 40. Thus, a mode to be set can be predicted for an image of a page displayed for a certain period of time, so that a number of modes are narrowed down to the predicted modes to be displayed, thereby improving operability.

The extraction of regularity by image forming apparatus 1 may be performed when previous page key 37 or next page key 38 is pressed after the same page is continuously displayed for the first period of time (after the feature of the image of the currently displayed page is validated), rather than being performed when the same page is continuously displayed for the second period of time as described above.

In place of displaying symbols such as previous page key 37 and next page key 38, flick input on touch panel 31 may be accepted to change preview image 40 to an image of the next page or the previous page.

FIG. 5 is a diagram schematically showing the preview feature information X stored in the HDD.

Referring to FIG. 5, the preview feature information X is created by image forming apparatus 1, for example, when scanner unit 20 scans an image of an original document. In the preview feature information X, in the horizontal direction (row direction) of the table, items concerning features such as "color," "orientation," "density," and "page number" are provided for an image of one page. In the vertical direction (column direction) of the table, the features of pages are arranged in increasing order of page number. It is understood from the preview feature information X in FIG. 5 that, for example, the image of page 1 is color, is orientated upward, has a density of 5, and is given a page number "1."

FIG. 6 is a diagram schematically showing the preview feature information Y stored in the HDD.

Referring to FIG. 6, the preview feature information Y is created by image forming apparatus 1 based on the features of the validated images, among the features of images of the preceding pages displayed prior to the currently displayed page, for example, when the same page is continuously displayed for the second period of time. The items concerning the features of each page that are included in the preview feature information Y are similar to those of the preview feature information X shown in FIG. 5. However, the features of the image of the not-validated page (in FIG. 6, the features of the image of page 3) are not included in the preview feature information Y. This is because the user has not yet taken time to examine the finished state of the image of the not-validated page.

When the user corrects the previewed image, the features of the corrected image may be validated and included in the preview feature information Y.

[Characteristics of Features of Image]

The features of an image to be included in the preview feature information X or the preview feature information Y are mainly classified into a qualitative feature, a quantative feature, and a consecutive value, according to the characteristics.

The qualitative feature is, for example, an image color (original color), an image orientation (original orientation), and the like. The original color is a feature as to whether an image is color or monochrome. The image orientation is a feature as to an angle of inclination (for example 0°, 90°, 180°, or 270°) of an image with respect to a reference orientation. In the case where a regularity concerning a qualitative feature is to be extracted, the regularity is extracted when all the pages have the same feature, when the same feature exists every N pages (N is, for example, an even number such as 2, 4, 6, or 8), or when the same feature exists through consecutive M pages.

As for the qualitative feature, for example, in the case where the same feature exists every N pages, the regularity exists such that when images of N pages are aggregately printed on a page, the same feature (a page number or a date) exists only at a particular position in the printed image. If N=4, the regularity exists such that when images of four pages are aggregately printed on a page, the images of page 1, page 5, page 9, . . . have the same feature different from the feature of other pages. If N=2, the regularity exists such that images of odd-numbered pages all have the same feature that is different from that of images of even-numbered pages (for example, the image orientation of odd-numbered pages is opposite to that of even-numbered pages). When images of consecutive four pages have the same feature, the regularity exists such that images of the first to fourth pages have the same feature, and a unit of consecutive four pages has the same feature that is different from the feature of any other unit of four pages.

The quantative feature is, for example, an image density. In the case where a regularity concerning a quantative feature is to be extracted, a mean value A and a standard deviation s are calculated based on the numerical value of image density of each page included in the preview feature information Y. In this case, image forming apparatus 1 determines whether the image of the currently displayed page agrees with the extracted regularity, based on whether the image density of the currently displayed page falls within a range of (the mean value A±the standard deviation s×i (for example, i is a positive number that can be set according to the feature of the image)).

The consecutive value is, for example, a page number given to each image. The regularity of consecutive values is to be continuous. In this case, image forming apparatus 1 determines whether the image of the currently displayed page agrees with the extracted regularity, based on whether the page number of the currently displayed page is continuous from another page.

[Kinds of Modes that can be Set]

A mode that can be set for the previewed image can be applied during printing. Examples of the mode include a color designation mode, a rotation mode, a page replacement mode, and a density adjustment mode.

The color designation mode is a mode of designating (changing) the color of an image of a particular page when the feature concerning a color of the image of the particular page does not agree with the extracted regularity. For example, when only the image of the currently previewed page is color while all the other pages are monochrome images, image forming apparatus 1 sets the color designation mode "designate monochrome" as correction menu 39. Accordingly, when the user scans an original document in auto-color although the user intended to print the original document all in monochrome, a partial color image can be printed in monochrome. In a case where a page includes few color portions and it is determined that the page looks the same even when printed in monochrome, the image of the page can be designated as monochrome. In a case where images of N pages are aggregately printed on a page, and the regularity is such that the printed image in one page is consistently color or monochrome. Then, when there exists a page against this regularity, image forming apparatus 1 displays the color designation mode "designate monochrome" as correction menu 39.

The rotation mode is a mode of rotating an image of a particular page when the feature concerning an orientation of the image of the particular page does not agree with the extracted regularity. For example, when only the image of the currently previewed image is oriented downward while the images of all the other pages are oriented upward, image forming apparatus 1 displays the rotation mode "rotate 180°" as correction menu 39. Accordingly, when the user sets only one sheet of an original document in the opposite direction in scanning the original document, the orientation of the original image can be easily corrected to the proper direction. In a case where images are oriented alternately upward and downward in the preceding pages, when the image of the currently previewed image is oriented in the same direction as the previous page, image forming apparatus 1 similarly displays the rotation mode "rotate 180°" as correction menu 39.

The orientation or page number of an image can be grasped based on a character extracted from an image, for example, by optical character recognition.

The page replacement mode is a mode of moving the position of an image of a particular page to another position (a mode of replacing an image of a particular page) when the feature concerning a page number given to the image of the particular page does not agree with the extracted regularity. For example, in a case where a page number is given at the bottom or the top of an image, when the page number of the currently previewed page is not continuous although page numbers in the preceding pages are consecutive, image forming apparatus 1 displays the "page replacement" mode as correction menu 39. Accordingly, when the user makes a mistake in the order of originals when scanning the originals, the position of the original can be easily corrected.

The density adjustment mode is a mode of changing the image density of a particular page when the feature concerning image density of the image of the particular page does not agree with the extracted regularity. For example, when the image density of the currently displayed page is too high or too low as compared with the image density of other pages, image forming apparatus 1 displays the "density adjustment mode" as correction menu 39. Accordingly, the user can easily correct the density of an image.

[Flowchart Showing Operation of Image Forming Apparatus]

A flowchart showing an operation of image forming apparatus 1 will now be described.

Figure 7:
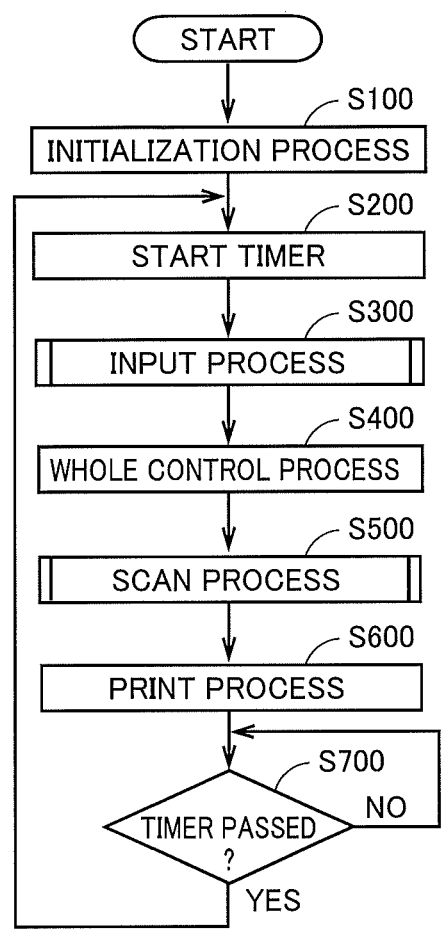
FIG. 7 is a flowchart showing an operation of the image forming apparatus according to an embodiment of the present invention.

FIG. 7 is a flowchart showing an operation of the image forming apparatus according to an embodiment of the present invention.

Referring to FIG. 7, when image forming apparatus 1 is powered on, CPU 11 of image forming apparatus 1 performs an initialization process (S100) and starts the timer (S200). CPU 11 then performs an input process (S300) and performs a whole control process (S400). Subsequently, CPU 11 performs a scan process (S500) and performs a print process (S600). Thereafter, CPU 11 determines whether the time measured by the timer has passed a prescribed time (S700).

If a prescribed time has passed (YES in S700), CPU 11 executes the process in step S200 again.

Figure 8:
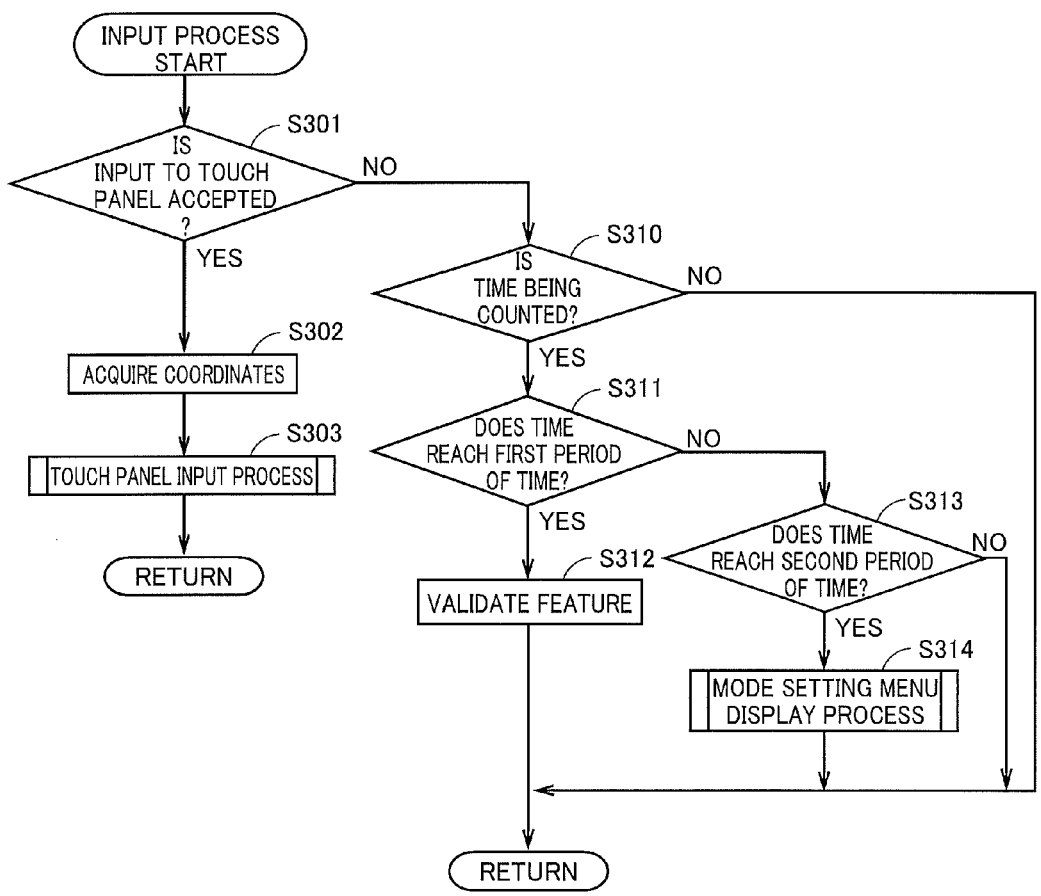
FIG. 8 shows a subroutine of an input process shown in step S300 in FIG. 7.

FIG. 8 shows a subroutine of the input process shown in step S300 in FIG. 7.

Referring to FIG. 8, in the input process in step S300, CPU 11 determines whether input to touch panel 31 is accepted from the user (S301).

If it is determined that input to touch panel 31 is accepted in step S301 (YES in S301), CPU 11 acquires the coordinates of the input position on touch panel 31 (S302) and performs a touch panel input process in accordance with the acquired coordinates of the position (S303). CPU 11 then returns.

If it is determined that input to touch panel 31 is not accepted in step S301 (NO in S301), CPU 11 determines whether the time is now being counted (S310). The time count is started in step S324 (FIG. 9) described later, and the counted time is equivalent to the time during which one preview image is displayed to the user (operator).

If it is determined that the time is now being counted in step S310 (YES in S310), CPU 11 determines whether the counted time reaches the first period of time (S311).

If it is determined that the counted time reaches the first period of time in step S311 (YES in S311), CPU 11 validates the feature of the previewed image (S312) and returns.

If it is determined that the counted times does not reach the first period of time in step S311 (NO in S311), CPU 11 determines whether the counted time reaches the second period of time (S313).

If it is determined that the counted time reaches the second period of time in step S313 (YES in S313), CPU 11 performs a mode setting menu display process (S314) and returns.

If it is determined that the time is not being counted in step S310 (NO in S310) or if it is determined that the counted time does not reach the second period of time in step S313 (NO in S313), CPU 11 returns.

Figure 9:
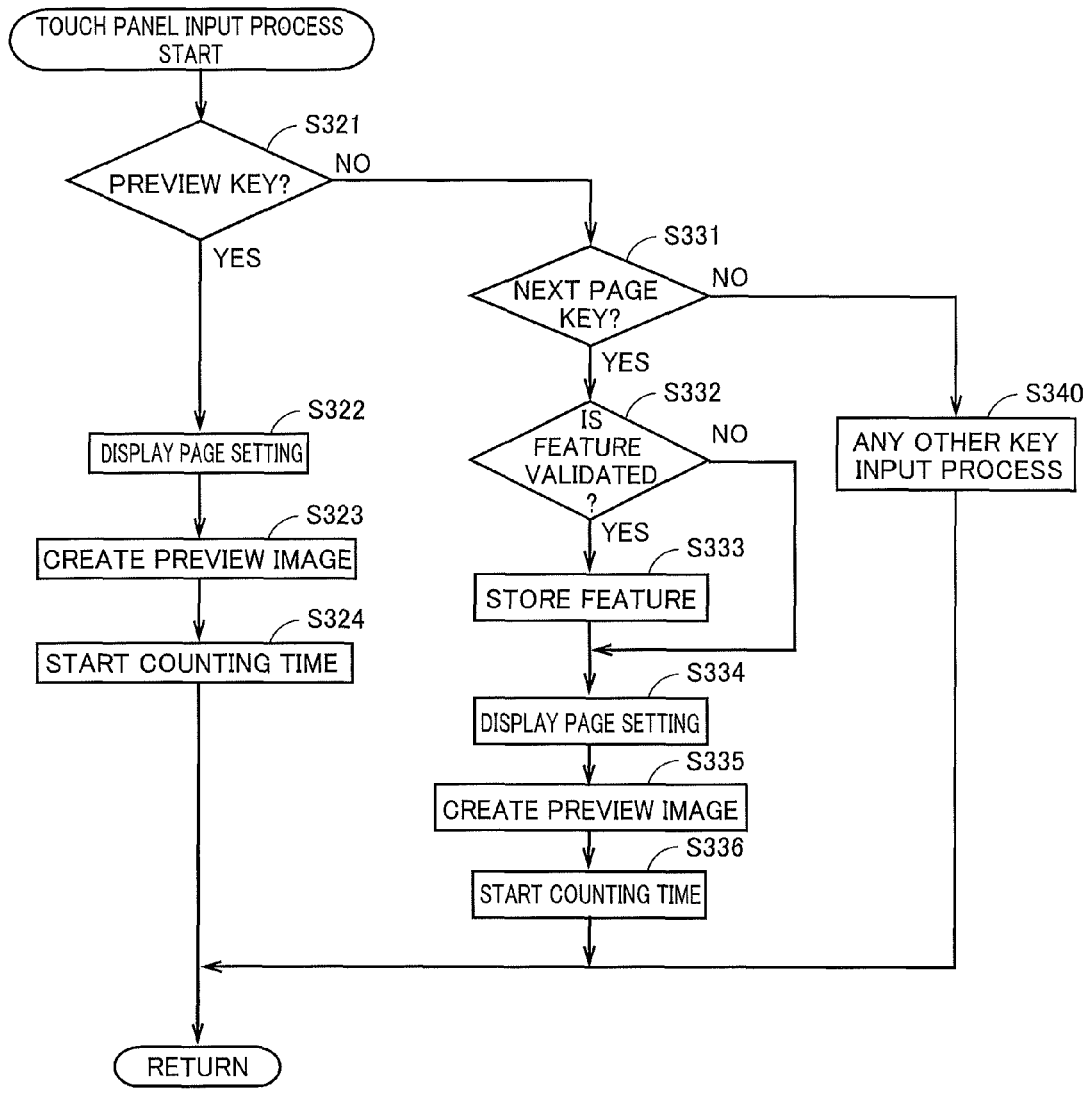
FIG. 9 shows a subroutine of a touch panel input process shown in step S303 in FIG. 8.

FIG. 9 shows a subroutine of the touch panel input process shown in step S303 in FIG. 8.

Referring to FIG. 9, in the touch panel input process in step S303, CPU 11 determines whether the input from the user is accepted by preview key 36 (S321).

If it is preview key 36 in step S321 (YES in S321), CPU 11 performs display page setting to designate the first page as a preview target (S322). CPU 11 then creates a preview image of the first page and displays the preview on touch panel 31 (S323). Subsequently, CPU 11 starts counting the time (S324) and returns.

If it is not the preview key in step S321 (NO in S321), CPU 11 determines whether the input from the user is accepted by next page key 38 (S331).

If it is next page key 38 in step S331 (YES in S331), CPU 11 determines whether the feature of preview image 40 currently displayed is validated, in order to determine whether to store the feature (S332).

If it is determined that the feature is validated in step S332 (YES in S332), CPU 11 determines that the feature extracted from the image is examined by the user. In this case, CPU 11 stores the feature in the preview feature information Y shown in FIG. 6 (S333) and proceeds to the process in step S334. If it is determined that the feature is not validated in step S332 (NO in S332), CPU 11 proceeds to the process in step S334.

In step S334, CPU 11 performs display page setting to designate the next page as a display target (S334). CPU 11 then creates a preview image of the next page and displays the preview on touch panel 31 (S335). Subsequently, CPU 11 starts counting the time (S336) and returns.

If it is not next page key 38 in step S331 (NO in S331), CPU 11 performs any other key input process in accordance with the input key (S340) and returns. In step S340, for example, if the setting of a mode from correction menu 39 is accepted from the user, CPU 11 corrects the previewed image in accordance with the set mode.

The mode setting menu display process shown in step S314 in FIG. 8 will now be described.

FIG. 10 is a diagram schematically showing a feature definition table stored in the HDD.

Referring to FIG. 10, when the mode setting menu display process is executed, image forming apparatus 1 extracts a regularity concerning the feature registered in the feature definition table. In the feature definition table, in the horizontal direction (row direction) of the table, the name of a feature (kind) and the characteristic of the feature (qualitative value, quantative value, or consecutive value) are defined for each number (n). In the vertical direction (column direction) of the table, numbers (n) are arranged in increasing order.

For a number 0, the feature concerning a color of an image (original color) is defined. This feature is a qualitative value (color or black). For a number 1, the feature concerning an orientation of an image (original orientation) is defined. This feature is a qualitative value (upward, downward, leftward, or rightward). For a number 2, the feature concerning a density of an image is defined. This feature is a quantative value (for example, a value in a range from one to ten). For a number 3, the feature concerning a page number is defined. This feature is a consecutive value (serial integer).

The feature definition table is registered as the initial information of image forming apparatus 1 in HDD 14 before execution of the preview process. The feature definition table may be stored as part of a program concerning the preview process in ROM 12.

Figure 11:
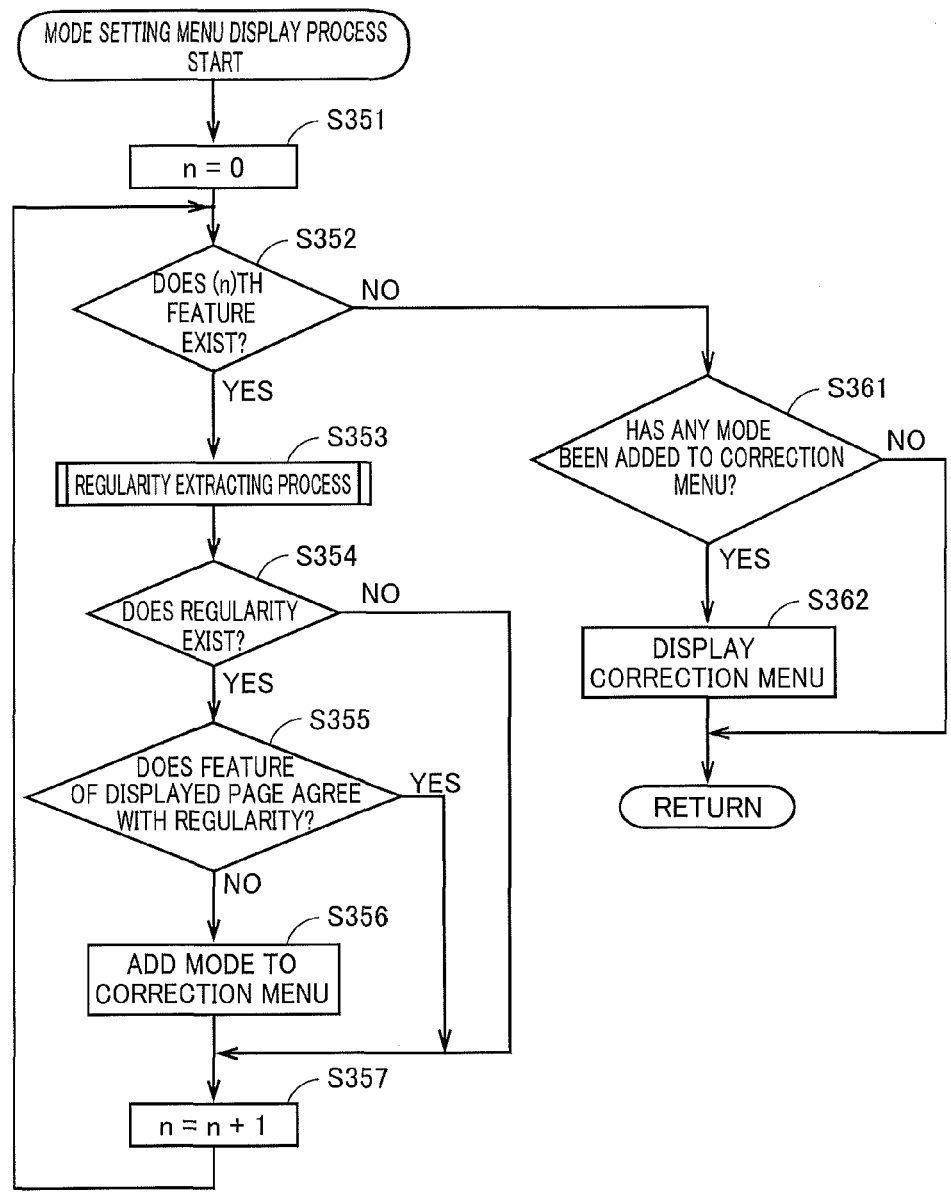
FIG. 11 shows a subroutine of a mode setting menu display process shown in step S314 in FIG. 8.

FIG. 11 shows a subroutine of the mode setting menu display process shown in step S314 in FIG. 8. In order to determine whether there exists a regularity among pages concerning a plurality of features, image forming apparatus 1 uses various filters described later to compare the features of pages and extracts a regularity.

Referring to FIG. 11, in the mode setting menu display process in step S314, CPU 11 sets a variable n to zero (initializes the variable n) (S351) and determines whether the (n)th feature exists in the feature definition table shown in FIG. 10 (S352).

If it is determined that the (n)th feature exists in step S352 (YES in S352), CPU 11 performs a regularity extracting process (S353) to extract a regularity concerning the (n)th feature. CPU 11 then determines whether a regularity exists for the feature subjected to the regularity extracting process (S354).

If it is determined that a regularity exists in step S354 (YES in S354), it follows that information has been acquired as to how the feature of the image of the currently displayed page should be. In this case, CPU 11 determines whether the (n)th feature of the image of the currently displayed page agrees with the regularity (S355).

If it is determined that it does not agree in step S355 (NO in S355), CPU 11 adds to correction menu 39 a mode for correcting the feature that does not agree (S356) and increments the variable n (S357). CPU 11 then proceeds to the process in step S352.

If it is determined that there exists no regularity in step S354 (NO in S354), or if it is determined that it agrees in step S355 (YES in S355), CPU 11 proceeds to the process in step S357 without adding a mode to correction menu 39.

If it is determined that the (n)th feature does not exist in step S352 (NO in S352), the regularity extracting process has been completed for all the features registered in the feature definition table shown in FIG. 10. In this case, CPU 11 determines whether any mode has been added to the correction menu, based on the results of regularity extraction performed so far (S361).

If it is determined that any mode has been added to the correction menu in step S361 (YES in S361), CPU 11 displays correction menu 39 on touch panel 31 (S362) and returns.

If it is determined that no mode has been added to the correction menu in step S361 (NO in S361), CPU 11 returns without displaying correction menu 39.

According to the method described above, a regularity among pages is found based on a feature of an image, and what feature the currently displayed image should have is determined. Only an appropriate mode is then displayed as the correction menu. This eliminates the need for displaying many unnecessary mode settings and allows the user to perform an operation promptly.

Figure 12:
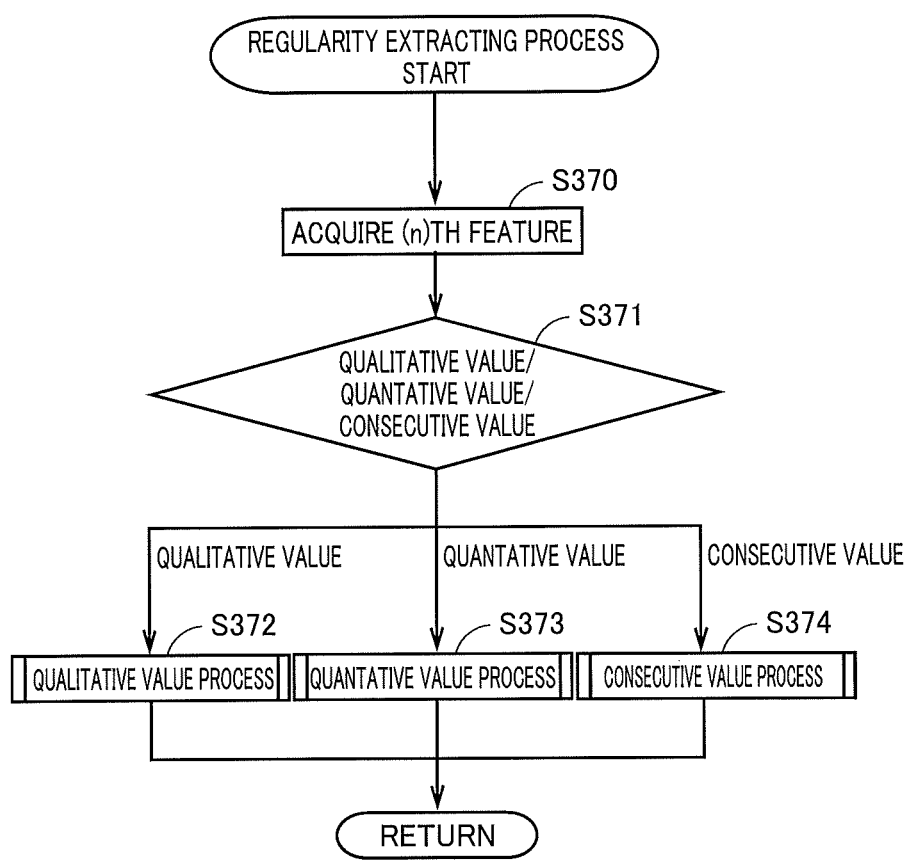
FIG. 12 shows a subroutine of a regularity extracting process shown in step S353 in FIG. 11.

FIG. 12 shows a subroutine of the regularity extracting process shown in step S353 in FIG. 11.

Referring to FIG. 12, in the regularity extracting process in step S353, CPU 11 acquires the (n)th feature from the feature definition table shown in FIG. 10 (S370) and determines what characteristic the feature has (S371).

Figure 14:
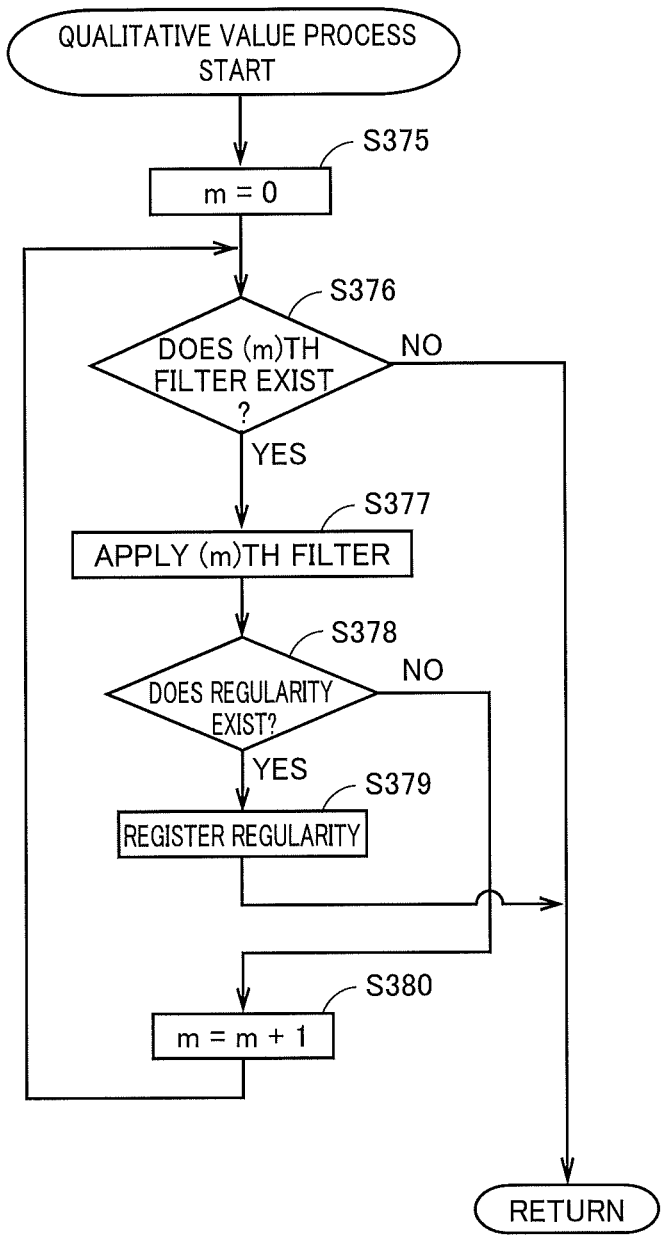
FIG. 14 shows a subroutine of a qualitative value process shown in step S372 in FIG. 12.

If it is determined that the characteristic of the acquired feature is a qualitative value in step S371 ("qualitative value" in S371), CPU 11 performs a qualitative value process shown in FIG. 14 (S372) and returns. If it is determined that the characteristic of the acquired feature is a quantative value in step S371 ("quantative value" in S371), CPU 11 performs a quantative value process shown in FIG. 15 (S373) and returns. If it is determined that the characteristic of the acquired feature is a consecutive value in step S371 ("consecutive value" in S371), CPU 11 performs a consecutive value process shown in FIG. 17 (S374) and returns.

The qualitative value process in S372 in FIG. 12 will now be described. The qualitative value process is a process of extracting a regularity in the case where the characteristic of the feature is a qualitative value.

FIG. 13 is a diagram schematically showing a filter for extracting a regularity from qualitative values (hereinafter also referred to as a qualitative value filter). The qualitative value filter is registered as initial information of image forming apparatus 1 in HDD 14 before execution of the preview process. The qualitative value filter may be stored as part of a program concerning the preview process in ROM 12.

Referring to FIG. 13, when the qualitative value process is executed, image forming apparatus 1 extracts a regularity using the qualitative value filter. In the qualitative value filter, in the horizontal direction (row direction) of the table, the content of the filter is defined for each number (m). In the vertical direction (column direction) of the table, numbers (m) are arranged in increasing order.

The zeroth filter defines that all pages have the same value. The first filter defines that consecutive two pages have the same value. The second filter defines that consecutive four pages have the same value. The third filter defines that consecutive eight pages have the same value. The fourth filter defines that every two pages have the same value. The fifth filter defines that every four pages have the same value.

The sixth filter defines that every eight pages have the same value. The qualitative value filter may additionally include a filter that defines that every N pages (N is a natural number) have the same value and/or a filter that defines that consecutive M pages (M is a natural number) have the same feature.

According to the zeroth filter, for example, a regularity in which the orientation is the same in all the originals can be extracted. When the user loads an original document in the ADF, if only the original of a particular page is set upside down, the zeroth filter is used to extract the regularity of the orientation of the original document and detect the page of the original turned upside down, which does not agree with the regularity, based on the extracted regularity. Accordingly, the user can rotate the image of the page upside down by setting the rotation mode from correction menu 39 displayed when the image of the page upside down is previewed. As another example, when only a particular page is color, the zeroth filter can be used to detect the page.

According to the first filter, for example, a regularity in which page 1 and page 2 have the same value and page 3 and page 4 have the same value can be extracted. For example, when the images of page 1 and page 2 are both color and the images of page 3 and page 4 are both only in black, the first filter can be used to extract the regularity concerning the color of the image.

In particular, according to the first filter, when the user uses the mode of printing images of two pages aggregately on a page, a regularity in a page having aggregated images can be extracted. For example, assume that the images of page 1 and page 3 are both color and the images of page 2 and page 4 are both only in black. Here, if printing is done in this state, the two pages having aggregated images are both printed in color, so that the user is charged for color printing of two pages. However, if the pages in which page 1 and page 2 are aggregated is corrected to an image only in black, and the page in which page 3 and page 4 are aggregated is corrected to a color image, a color print fee is charged only for one page, and thus the print cost can be saved. By detecting a regularity using the first filter, the image can be corrected so that the color of the aggregated images is unified in one page.

The second filter and the third filter can extract a regularity in a page having aggregated images when the user uses a mode of printing images of four pages or images of eight pages onto a page, in a similar manner as in the first filter.

According to the fourth filter, the same feature among even-numbered pages or the same feature among odd-numbered pages can be extracted. For example, in a case where the extracted regularity is such that the images of odd-numbered pages are oriented upward and the images of even-numbered pages are oriented downward, duplex printing with top binding is performed when such images are printed. However, if the user loads an original document in the ADF with a particular page turned upside down, the fourth filter is used to extract a regularity concerning original orientation and detect the page of the original turned upside down, which does not agree with the regularity, based on the extracted regularity. Accordingly, the user can rotate the image of the page upside down by setting the rotation mode from correction menu 39 displayed when the image of the page upside down is previewed.

FIG. 14 shows a subroutine of the qualitative value process shown in step S372 in FIG. 12.

Referring to FIG. 14, in the qualitative value process in step S372, CPU 11 sets a variable m to zero (initializes the variable m) (S375) and determines whether the (m)th filter exists in the qualitative value filter shown in FIG. 13 (S376).

If it is determined that the (m)th filter exists in step S376 (YES in S376), CPU 11 applies the (m)th filter to the preview feature information Y (S377) and determines whether a regularity exists with the application of the (m)th filter (S378). On the other hand, if it is determined that the (m)th filter does not exist in step S376 (NO in S376), it follows that all the filters in the qualitative value filter shown in FIG. 13 have been applied. In this case, CPU 11 returns.

The determination as to whether a regularity exists in step S378 is made from pages in multiples of the unit defined in a filter, among pages registered in the preview feature information Y. For example, when the second filter is used, whether a regularity exists is determined from pages in multiples of 2, such as two pages, four pages, six pages, . . . .

If it is determined that there exists a regularity in step S378 (YES in S378), CPU 11 registers that regularity (S379) and returns.

When it is determined that there exists a regularity in step S378, image forming apparatus 1 can estimate the feature of the image of the displayed page. For example, in the case of using the zeroth filter, it is estimated that the image of the displayed page has the same feature as the image of the previous page. In the case of using the first filter, when the displayed page is a multiple of 2, it is estimated that the image of the displayed page has the same feature as the previous page. In the case of using the second filter, when the displayed page is (a multiple of 4+2), (a multiple of 4+3) or a multiple of 4, it is estimated that the feature of the image of the displayed page is the same feature as the feature of the previous page. In the case of using the third filter, the feature of the displayed image is estimated similarly to the case of the first filter or the second filter. In the case of using the fourth filter, it is estimated that the image of the displayed page has the same feature as the image of the second preceding page. In the case of using the fifth filter, it is estimated that the image of the displayed page has the same feature as the image of the fourth preceding page. In the case of using the sixth filter, it is estimated that the image of the displayed image has the same feature as the image of the eighth preceding page.

In step S379, if the feature of the image of the displayed page does not agree with the estimated feature, it is preferable to register a mode for correcting that image as a regularity, for example, in HDD 14. Specifically, if the feature is the number 0 in the feature definition table shown in FIG. 10, the "designate monochrome" mode or the "designate color" mode is registered. If the feature is the number 1, the "designate rotation" mode is registered.

If it is determined that there exists no regularity in step S378 (NO in S378), CPU 11 increments the variable m (S380) and proceeds to step S376 to determine a regularity using the next filter.

The quantative value process in step S373 in FIG. 12 will now be described. The quantative value process is a process of extracting a regularity in the case where the characteristic of the feature is a quantative value.

Figure 15:
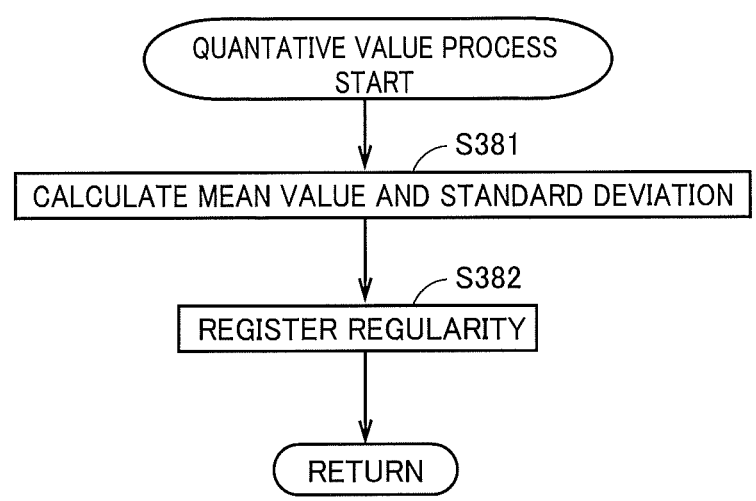
FIG. 15 shows a subroutine of a quantative value process shown in step S373 in FIG. 12.

FIG. 15 shows a subroutine of the quantative value process shown in step S373 in FIG. 12.

Referring to FIG. 15, in the quantative value process in step S373, CPU 11 calculates the mean value and the standard deviation from the features of the quantative values in the preview feature information Y (S381) and registers the regularity (S382). If the quantative value is image density, in step S382, CPU 11 registers a range of density permitted for the displayed image as a regularity, based on the mean value and the standard deviation of the image density. For example, CPU 11 registers a range of density (mean value A±standard deviation s×i (where i is a positive value, for example, three)) as a regularity and registers the "density adjustment" mode. Accordingly, the user performs density adjustment from correction menu 39 for the image of which density is too high or too low from the prescribed range of density, so that the density in printouts is uniform.

The consecutive value process in step S374 in FIG. 12 will now be described. The consecutive value process is a process of extracting a regularity in the case where the characteristic of the feature is a consecutive value.

FIG. 16 is a diagram schematically showing a filter for extracting a regularity from numerical values (hereinafter also referred to as a numerical value filter). The numerical value filter is registered as initial information of image forming apparatus 1 in HDD 14 before execution of the preview process. The numerical value filter may be stored as part of a program concerning the preview process in ROM 12.

Referring to FIG. 16, when the consecutive value process is executed, image forming apparatus 1 extracts a regularity using the numerical value filter.

Referring to FIG. 16, when the consecutive value process is executed, image forming apparatus 1 extracts a regularity using the numerical value filter in FIG. 16. In the numerical value filter, in the horizontal direction (row direction) of the table, the content of the filter is defined for each number (k). In the vertical direction (column direction) of the table, numbers (k) are arranged in increasing order.

The zeroth filter defines that every page has a consecutive value. The first filter defines that every two pages have a consecutive value. The second filter defines that every four pages have a consecutive value. The third filter defines that every eight pages have a consecutive value.

For example, assume that images (originals) are given page numbers. In this case, according to the zeroth filter, a page number is given every page, and a regularity in which the page numbers are consecutive can be extracted. According to the first filter, a page number is given every two pages, and a regularity in which the page numbers are consecutive can be extracted. According to the second filter, a page number is given every four pages, and a regularity in which the page numbers are consecutive can be extracted. According to the third filter, a page number is given every eight pages, and a regularity in which the page numbers are consecutive can be extracted.

For example, in a case where consecutive page numbers are given to the respective pages of the scanned original document, when the zeroth filter is applied to the original images, a regularity in which the page numbers are consecutive is extracted. Here, if an original document is loaded in the ADF with pages partially misplaced, the page numbers are not consecutive in particular pages, so that it is determined that the regularity is not satisfied. In this case, the "page replacement" mode is added to correction menu 39 to allow the user to correct the image by setting this mode.

According to the first filter, in the case where the user uses a mode of printing images of two pages aggregately on a page, a regularity in which a page number is given at a particular portion of a page having images aggregated can be extracted. More specifically, when page numbers are given to odd-numbered pages of the original document and these page numbers are consecutive, the regularity of the page numbers can be extracted. The second filter and the third filter can also be used to extract a similar regularity as in the first filter.

Figure 17:
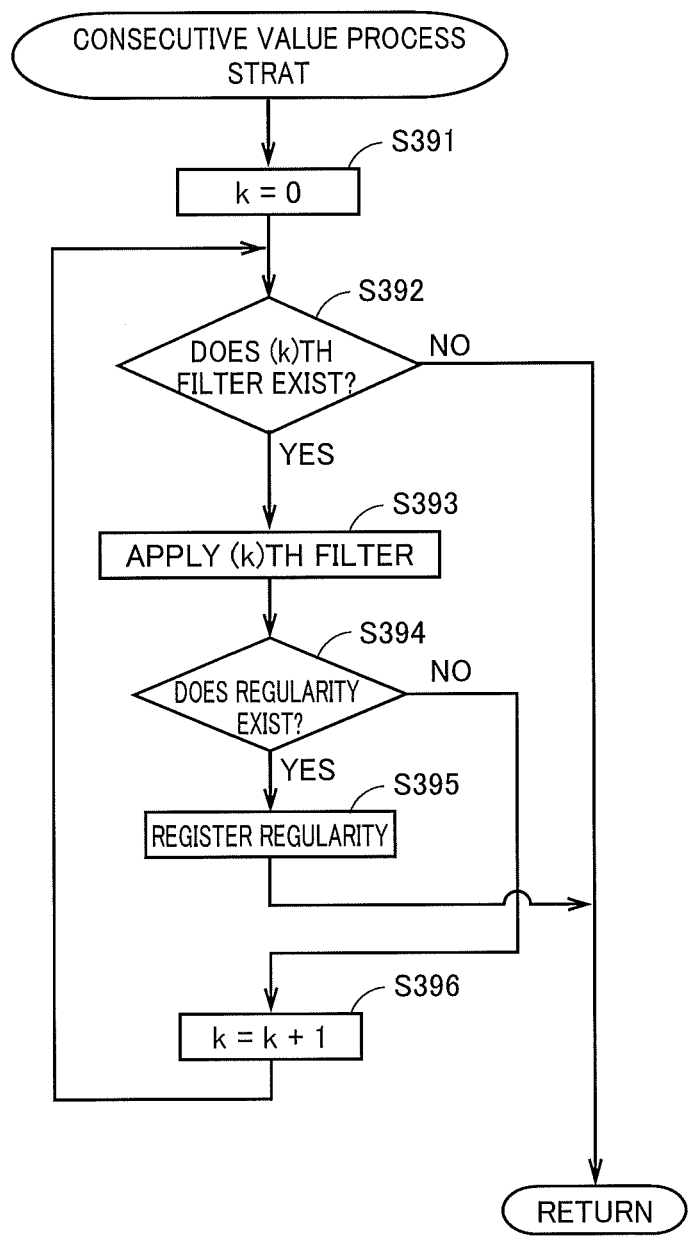
FIG. 17 shows a subroutine of a consecutive value process shown in step S374 in FIG. 12.

FIG. 17 shows a subroutine of the consecutive value process shown in step S374 in FIG. 12.

Referring to FIG. 17, in the consecutive value process in step S374, CPU 11 sets a variable k to zero (initializes the variable k) (S391) and determines whether the (k)th filter exists in the numerical value filter shown in FIG. 16 (S392).

If it is determined that the (k)th filter exists in step S392 (YES in S392), CPU 11 applies the (k)th filter to the preview feature information Y (S393) and determines whether there exists a regularity with the application of the (k)th filer (S394). On the other hand, if it is determined that the (k)th filter does not exist in step S392 (NO in S392), it follows that all the filters registered in the numerical value filter shown in FIG. 16 have been applied. In this case, CPU 11 returns.

Specifically, the determination as to whether a regularity exists in step S394 is made in the following manner. For example, in the case of using the first filter, when the image of the currently displayed page is an odd-numbered page, whether a regularity exists is determined based on whether numerical values are consecutive among odd-numbered pages whose features have been registered. When the image of the currently displayed page is an even-numbered page, whether a regularity exists is determined based on whether numerical values are consecutive among even-numbered pages whose features have been registered.

In the case of using the second filter, if the currently displayed page is the (multiple of 4+1)th page, whether a regularity exists is determined based on whether numerical values are consecutive every (multiple of 4+1) pages whose features have been registered (specifically, page 1, page 5, page 9, . . . ). If the image of the currently displayed page is the (multiple of 4+2)th page, whether a regularity exists is determined based on whether numerical values are consecutive every (multiple of 4+2) pages whose features have been registered (specifically, page 2, page 6, page 10, . . . ). If the image of the currently displayed page is the (multiple of 4+3)th page, whether a regularity exists is determined based on whether numerical values are consecutive every (multiple of 4+3) pages whose features have been registered (specifically, page 3, page 7, page 11, . . . ). If the image of the currently displayed page is the page of a multiple of 4, whether a regularity exists is determined based on whether numerical values are consecutive every (multiple of 4) pages whose features have been registered (specifically, page 4, page 8, page 12, . . . ).

If it is determined that there exists a regularity in step S394 (YES in S394), CPU 11 registers that regularity (S395) and returns.

If it is determined that there exists a regularity in step S394, image forming apparatus 1 can estimate the feature of the image of the displayed page. For example, in the case of using the zeroth filter, it is estimated that the image of the displayed page has a numerical value that is continuous from the image of the previous page. In the case of using the first filter, it is estimated that the image of the displayed page has a value that is continuous from the image of the second preceding image. In the case of using the second filter, it is estimated that the image of the displayed page has a value that is continuous from the image of the fourth preceding page. In the case of using the third filter, it is estimated that the image of the displayed page has a value that is continuous from the image of the eighth preceding page.

In step S395, when the feature of the image of the displayed page does not agree with the estimated feature, it is preferable to register a mode for correcting the image as a regularity, for example, in HDD 14. Specifically, if the feature is the number 3 in the feature definition table shown in FIG. 10, the "page replacement" mode is registered.

If it is determined there exists no regularity in step S394 (NO in S394), CPU 11 increments the variable k (S396) and proceeds to step S392 to determine a regularity using the next filter.

Figure 18:
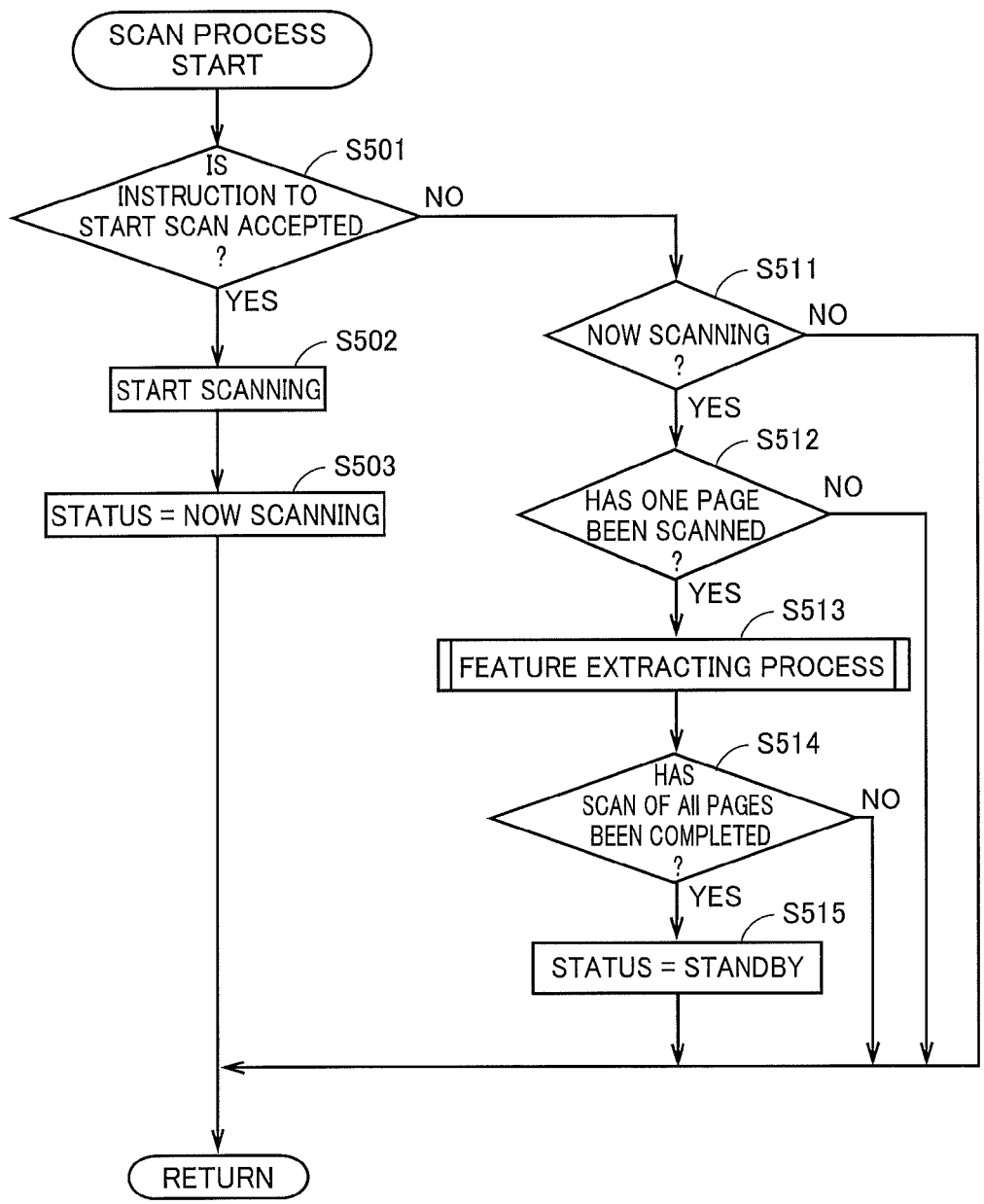
FIG. 18 shows a subroutine of a scan process shown in step S500 in FIG. 7.

FIG. 18 shows a subroutine of the scan process shown in step S500 in FIG. 7.

Referring to FIG. 18, in the scan process in step S500, CPU 11 determines whether an instruction to start scan is accepted from the whole control unit (entire control process) (S501).

If it is determined that a start request is accepted in step S501 (YES in S501), CPU 11 starts scanning the original document loaded in the ADF (S502) and sets the status of image forming apparatus 1 now scanning (the state in FIG. 3) (S503), and then returns.

If it is determined that a start request is not accepted in step S501 (NO in S501), CPU 11 determines whether scanner unit 20 is now scanning an original image (S511). If it is determined that it is now scanning (YES in S511), CPU 11 determines whether an original image of one page has been scanned (S512).

If it is determined that an original image of one page has been scanned in step S512 (YES in S512), CPU 11 performs a feature extracting process and creates the preview feature information X shown in FIG. 5 based on the extracted feature (S513). Subsequently, CPU 11 determines whether scan of images of all pages of the original document has been completed (S514).

If it is determined that scan has been completed in step S514 (YES in S514), CPU 11 sets the status of image forming apparatus 1 standby (the state in FIG. 4) (S515), and returns.

If it is determined that the scanner is not scanning now in step S511 (NO in S511), if it is determined that the original image of one page has not yet been scanned in step S512 (NO in S512), or if it is determined that scan has not yet been completed in step S514 (NO in S514), CPU 11 returns without performing the feature extracting process.

Figure 19:
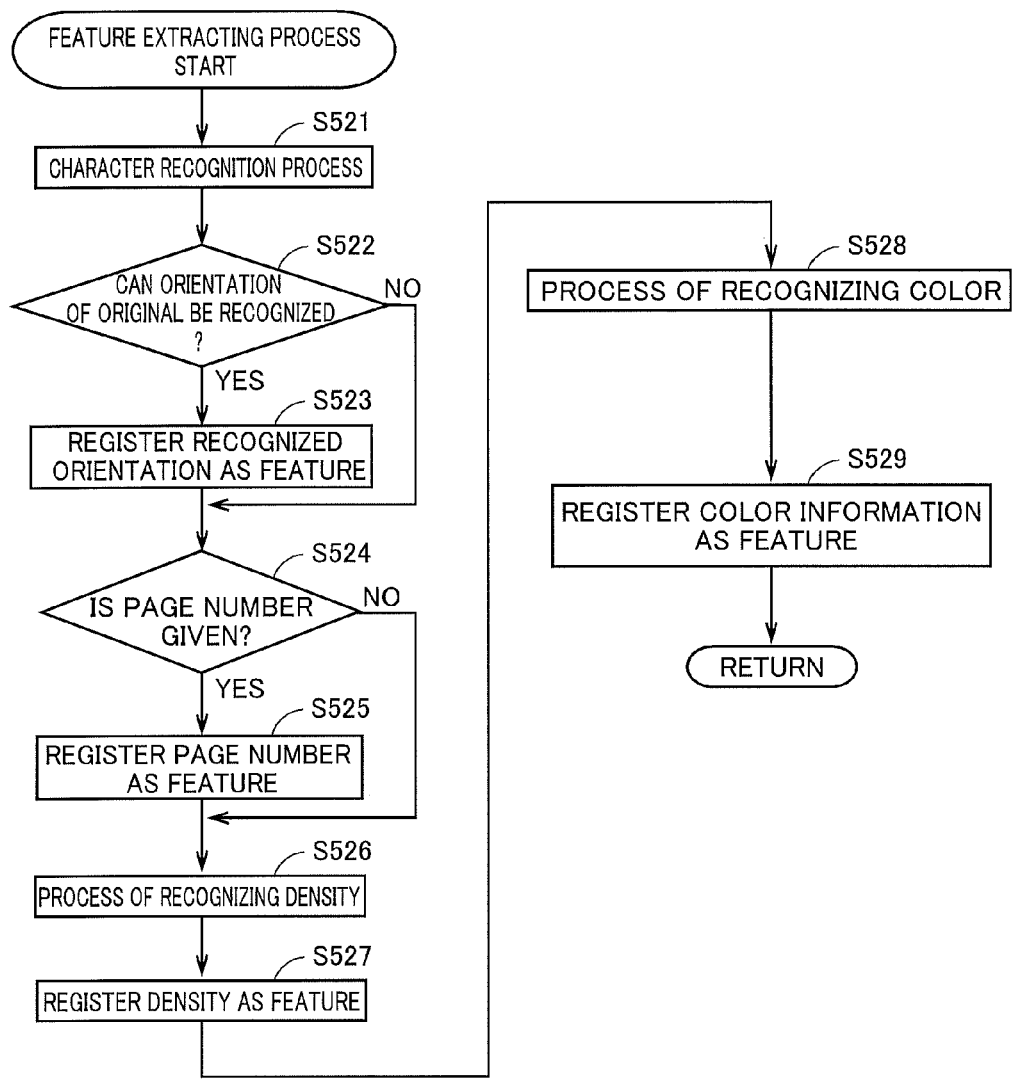
FIG. 19 shows a subroutine of a feature extracting process shown in step S513 shown in FIG. 18.

FIG. 19 shows a subroutine of the feature extracting process shown in step S513 shown in FIG. 18.

Referring to FIG. 19, in the feature extracting process in step S513, CPU 11 performs a character recognition process for the scanned original image (S521). CPU 11 then determines whether the orientation of the original can be recognized based on the character recognized in the character recognition process (S522).

If it is determined that the orientation of the original image can be recognized in step S522 (YES in S522), CPU 11 registers the recognized orientation of the original as a feature in the preview feature information X (S523) and proceeds to the process in step S524. On the other hand, if it is determined that the orientation of the original image cannot be recognized in step S522 (NO in S522), CPU 11 proceeds to the process in step S524 without registering the orientation of the image.

In step S524, CPU 11 determines whether a page number is given to the image (S524). If it is determined that a page number is given in step S524 (YES in S524), the page number is registered as a feature in the preview feature information X (S525) and proceeds to the process in step S526. On the other hand, if it is determined that a page number is not given (NO in S524), CPU 11 proceeds to the process in step S526 without registering a page number.

In step S526, CPU 11 performs a process of recognizing the density of the original image (S526) and registers the obtained image density as a feature in the preview feature information X (S527). Subsequently, CPU 11 performs a process of recognizing the color of the original image (S528) and registers the obtained color information of the image as a feature in the preview feature information X (S529). CPU 11 then returns.

[First Modification]

A first modification of the operation of the image forming apparatus as described above will now be described.

In the first modification, the operation differs from the operation of image forming apparatus 1 described above in that the feature of the image of the currently displayed page is stored in the preview feature information Y when an OK key is pressed, rather than validating the feature of the image of the currently displayed page when the same page is continuously displayed for the first period of time.

Figure 20:
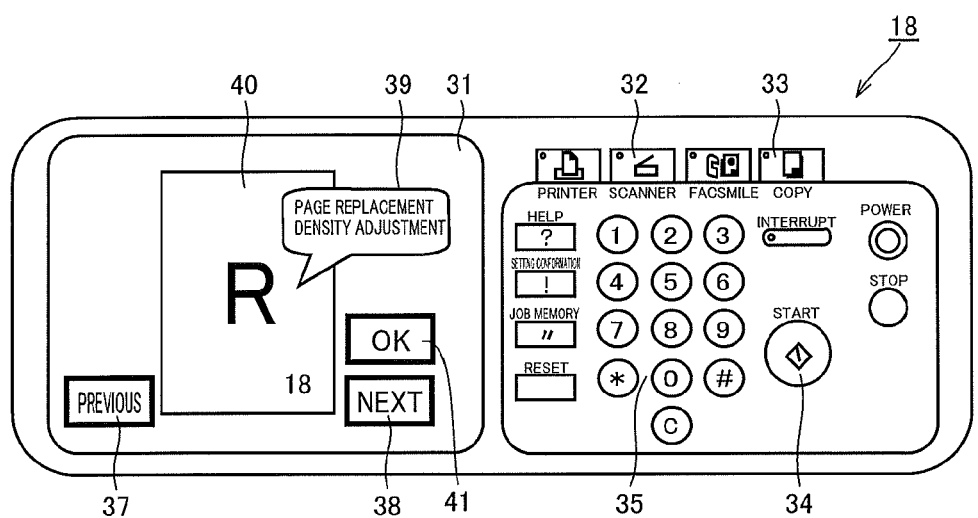
FIG. 20 is a diagram schematically showing a display state of the operation panel in a case where a preview button is pressed according to a first modification.

FIG. 20 is a diagram schematically showing a display state of the operation panel in a case where the preview button is pressed according to the first modification.

Referring to FIG. 20, when preview key 36 is pressed in FIG. 3, image forming apparatus 1 further displays an OK key 41 on touch panel 31.

When OK key 41 is pressed in the display state shown in FIG. 20, image forming apparatus 1 determines that the user fully recognizes the feature of the original from the preview image and the user determines that the image has no error (the image is approved). In this case, image forming apparatus 1 registers the feature of the image of the currently displayed page in the preview feature information Y and changes preview image 40 to the image of the following page. The approval of the image from the user may be accepted in a way other than pressing OK key 41.

Figure 21:
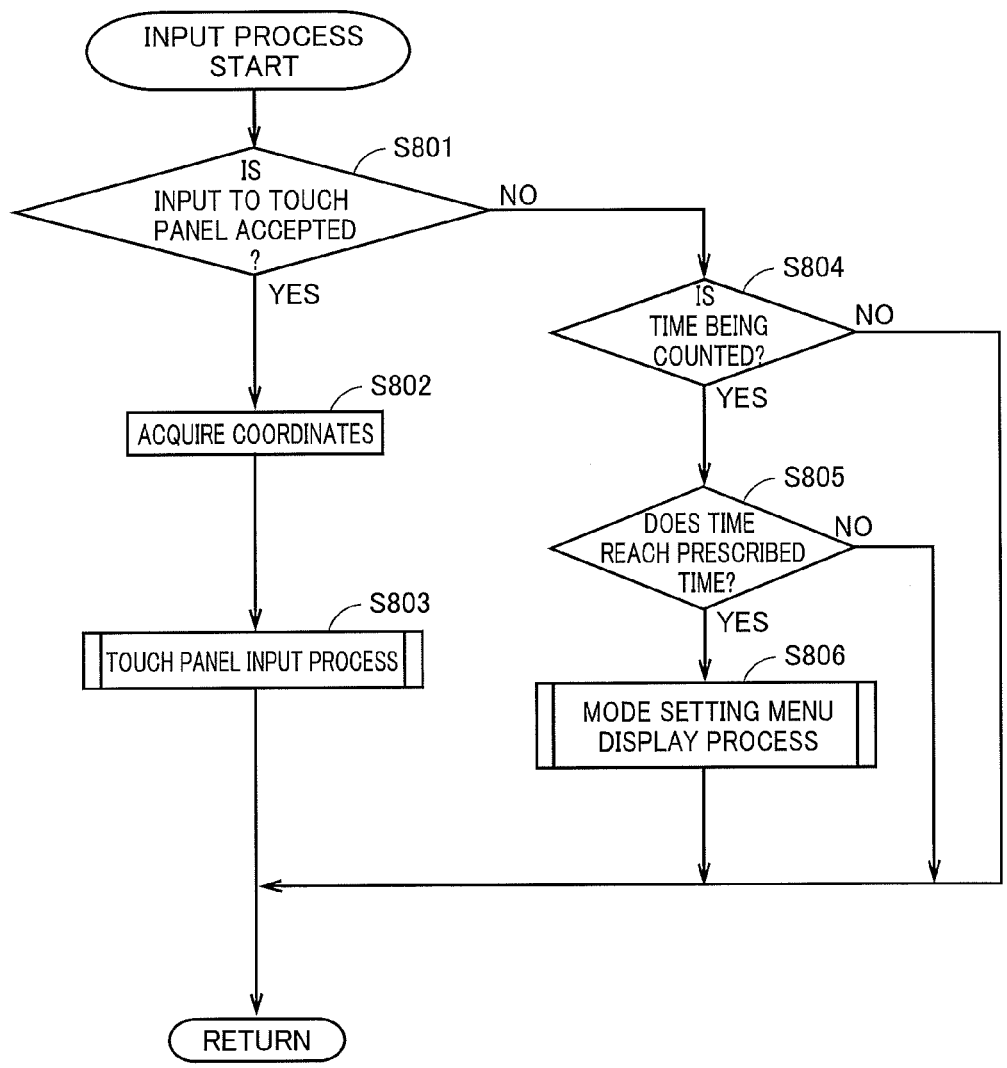
FIG. 21 shows a subroutine of an input process shown in step S300 in FIG. 7 according to the first modification.

FIG. 21 shows a subroutine of the input process shown in step S300 in FIG. 7 according to the first modification.

Referring to FIG. 21, in the input process in step S300 according to the first modification, CPU 11 determines whether input to touch panel 31 is accepted from the user (S801).

If it is determined that input to touch panel 31 is accepted in step S801 (YES in S801), CPU 11 acquires the coordinates of the input position on touch panel 31 (S802) and performs a touch panel input process (S803) according to the acquired coordinates of the position. CPU 11 then returns.

If it is determined that input to touch panel 31 is not accepted in step S801 (NO in S801), CPU 11 determines whether the time is now being counted (S804).

If it is determined that the time is being counted now in step S804 (YES in S804), CPU 11 determines whether the counted time reaches a prescribed time (S805).

If it is determined that the counted time reaches a prescribed time in step S805 (YES in S805), CPU 11 performs a mode setting menu display process (S806) and returns. In the mode setting menu display process in step S806, CPU 11 executes a subroutine of the mode setting menu display process shown in FIG. 11.

If it is determined that the time is not being counted now in step S804 (NO in S804), or if it is determined that the counted time does not reach a prescribed time in step S805 (NO in S805), CPU 11 returns.

Figure 22:
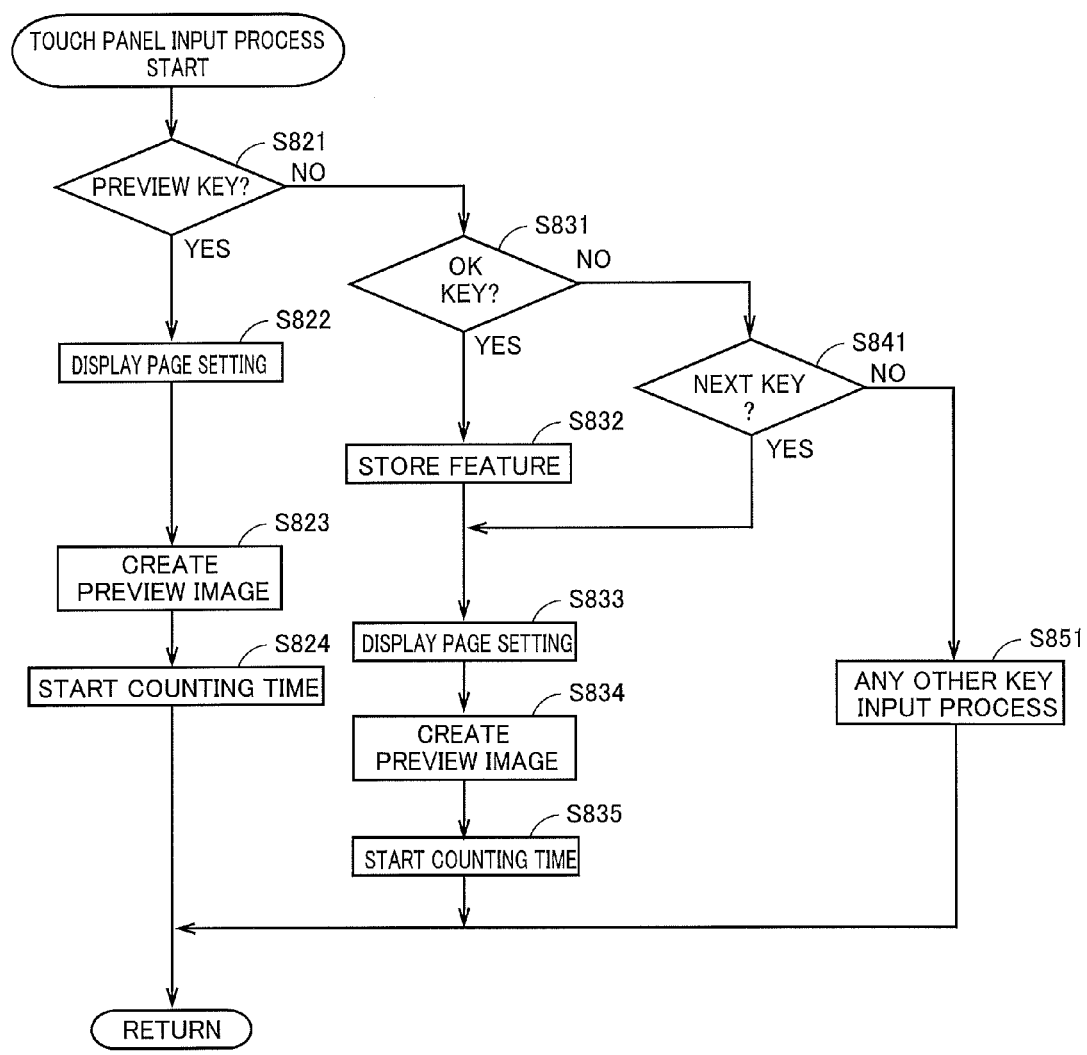
FIG. 22 shows a subroutine of a touch panel input process shown in step S803 in FIG. 21.

FIG. 22 shows a subroutine of the touch panel input process shown in step S803 in FIG. 21.

Referring to FIG. 22, in the touch panel input process in step S803, CPU 11 determines whether the input from the user is accepted by preview key 36 (S821).

If it is accepted by preview key 36 in step S821 (YES in S821), CPU 11 performs display page setting to designate the first page as a preview target (S822). CPU 11 then creates a preview display image of the first page and displays the preview on touch panel 31 (S823). Subsequently, CPU 11 starts counting the time (S824) and returns.

If it is not accepted by the preview key in step S821 (NO in S821), CPU 11 determines whether the input from the user is accepted by OK key 41 (S831).

If it is OK key 41 in step S831 (YES in S831), CPU 11 determines that the feature extracted from the image is approved by the user. In this case, CPU 11 stores the feature in the preview feature information Y shown in FIG. 6 (S832) and proceeds to the process in step S833.

In step S833, CPU 11 performs display page setting to designate the page as a preview target in accordance with the key pressed by the user (S833). CPU 11 then creates a preview image of the designated page and displays the preview on touch panel 31 (S834). Subsequently, CPU 11 starts counting the time (S835) and returns.

If it is not OK key 41 in step S831 (NO in S831), CPU 11 determines whether the input from the user is accepted by previous page key 37 or next page key 38 (S841).

If it is previous page key 37 or next page key 38 in step S841 (YES in S841), CPU 11 proceeds to the process in step S833 to designate the page as a preview target in accordance the key pressed by the user. In this case, CPU 11 determines that the user changes the page without examining the image, and does not store the feature of the original.

If it is neither previous key 37 nor next page key 38 in step S841 (NO in S841), CPU 11 performs any other key input process in accordance with the input key (S851) and returns. In step S851, for example, when the setting of a mode from correction menu 39 is accepted from the user, CPU 11 corrects the previewed image in accordance with the set mode.

[Second Modification]

A second modification of the operation of the image forming apparatus as described above will now be described.

In the second modification, the operation of the image forming apparatus as described above is simplified. The configuration of the image forming apparatus is the same as the configuration of the image forming apparatus as described above, and a description thereof will not be repeated individually.

Figure 23:
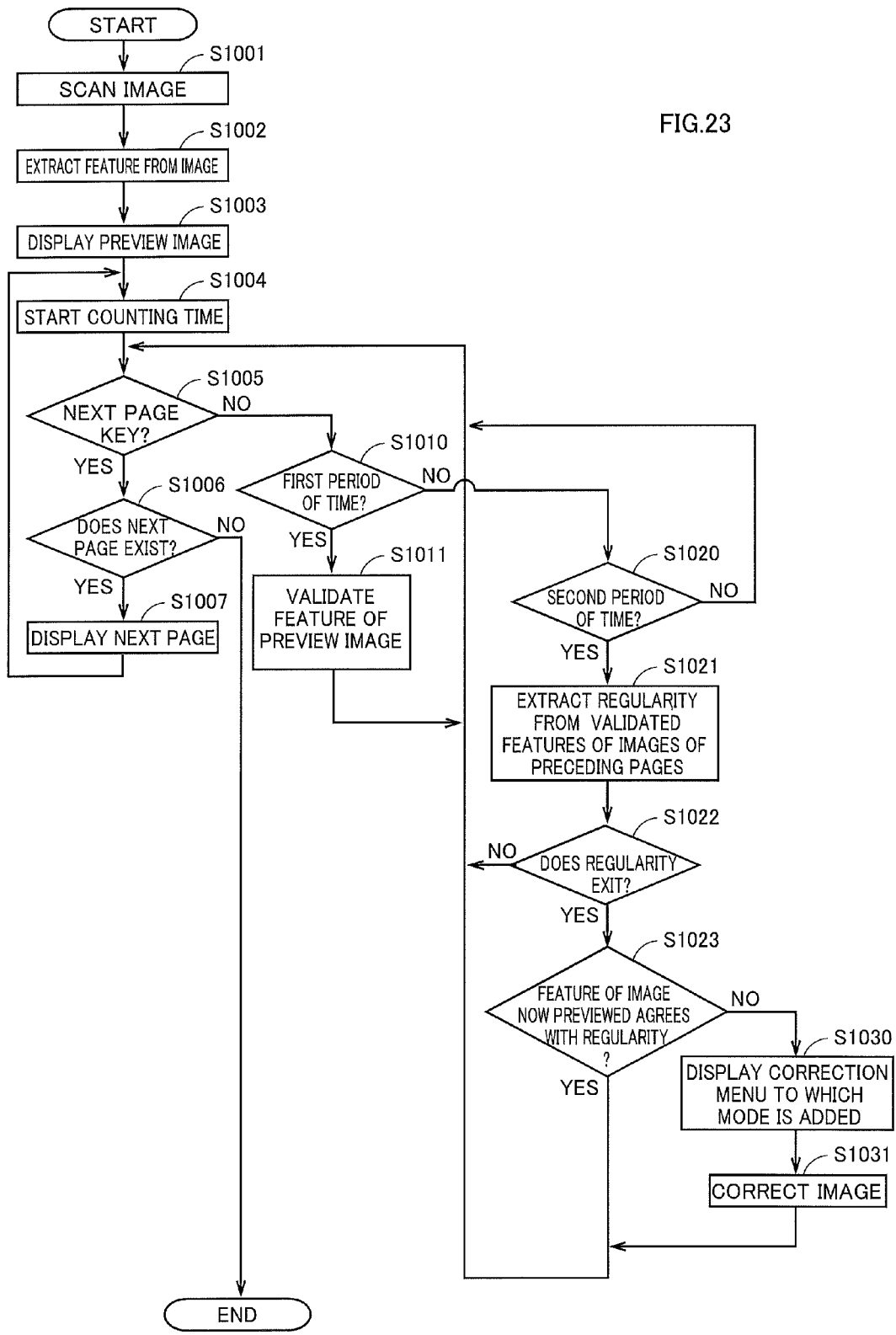
FIG. 23 is a flowchart showing an operation of the image forming apparatus according to a second modification.

FIG. 23 is a flowchart showing an operation of the image forming apparatus according to the second modification.

Referring to FIG. 23, when an instruction to execute a scan job or a copy job is accepted, CPU 11 scans images of all the originals loaded in the ADF (S1001), extracts the features from the scanned original images, and registers the features in the preview feature information X (S1002). CPU 11 then starts preview in accordance with an instruction from the user and displays a preview image of the first page (S1003), and also starts counting the time during which the image is being displayed to the user (S1004). Subsequently, CPU 11 determines whether next page key 38 is pressed (S1005).

If it is determined that next page key 38 is pressed in step S1005 (YES in S1005), CPU 11 determines whether the next page exists (S1006).

If it is determined that the next page exists in step S1006 (YES in S1006), CPU 11 displays the image of the next page on touch panel 31 (S1007) and proceeds to the process in step S1004 to start counting the time. On the other hand, if it is determined that the next page does not exist in step S1006 (NO in S1006), CPU 11 terminates the process.

If it is determined that next page key 38 is not pressed in step S1005 (NO in S1005), CPU 11 determines whether the counted time reaches the first period of time (S1010).

If it is determined that the counted time reaches the first period of time in step S1010 (YES in S1010), CPU 11 validates the feature of the preview image and registers the validated feature in the preview feature information Y (S1011). CPU 11 then proceeds to the process in step S1005.

If it is determined that the counted time does not reach the first period of time in step S1010 (NO in S1010), CPU 11 determines whether the counted time reaches the second period of time (S1020).

If it is determined that the counted time reaches the second period of time in step S1020 (YES in S1020), CPU 11 extracts a regularity from the validated features of images of the preceding pages (the features registered in the preview feature information Y) (S1021) and determines whether there exists a regularity in the features of the preceding pages (S1022).

If it is determined that a regularity exists in step S1022 (YES in S1022), CPU 11 determines whether the feature of the image now previewed agrees with the regularity (S1023).

If it is determined that it does not agree in step S1023 (NO in S1023), CPU 11 displays on touch panel 31 correction menu 39 to which a mode for correcting the feature that does not agree is added (S1030). Then, when an instruction is accepted from the user through correction menu 39, CPU 11 corrects the image in accordance with the instruction (S1031) and proceeds to the process in step S1005.

If it is determined that the counted time does not reach the second period of time in step S1020 (NO in S1020), if it is determined that no regularity exists in step S1022 (NO in S1022), or if it is determined that it agrees in step S1023 (YES in S1023), CPU 11 proceeds to the process in step S1005 to determine whether next page key 38 is pressed.

[Effects of Embodiments]

According to the foregoing embodiments, a convenient image processing apparatus is provided.

When an image is previewed, if the image of the same page is displayed on the operation panel for a prescribed period of time or longer, or if the image displayed on the operation panel is approved, the image forming apparatus in the foregoing embodiments compares the feature of the image of the opened page (the currently displayed page) with the regularity extracted from the features of the images of the pages preceding the opened page thereby to narrow down modes and display an appropriate mode on the operation panel. Accordingly, a mistake that the user may wish to correct in the image of the previewed page is estimated from the features of the images that the user determines to be normal in the preceding pages, so that a mode for correcting the mistake can be displayed. As a result, the mode setting can be easily performed on a page-by-page basis in the preview screen, thereby improving convenience.

The feature of the image is validated when the time reaches the first period of time, so that a regularity can be extracted from the images that the user takes time to examine. Accordingly, an appropriate mode can be included in the correction menu.

The correction menu is displayed when the time reaches the second period of time, so that the correction menu can be displayed when the user takes time to examine the image. Accordingly, a correction menu can be displayed at an appropriate timing.

[Others]

In the foregoing embodiments, the feature of the image is validated when the first period of time is reached. However, irrespective of the elapsed time, the feature of the image of the page previewed on the display unit may be stored.

In the foregoing embodiments, the correction menu is displayed when the second period of time is reached. However, the correction menu concerning the image of the page previewed on the display unit may be displayed irrespective of the elapsed time. The correction menu may be displayed when a key displayed on the display unit for displaying the correction menu is pressed.

The foregoing embodiments can be combined as appropriate. For example, the first modification and the second modification may be combined. In this case, the feature may be stored not when the first period of time is reached but when the OK button is pressed in the second modification.

The process in the foregoing embodiments may be performed either by software or by a hardware circuit. A program for executing the process in the foregoing embodiments may be provided. A medium such a CD-ROM, a flexible disk, a hard disk, a ROM, a RAM, and a memory card encoded with the program may be provided to the user. The program is executed by a computer such as a CPU. The program may be downloaded to an apparatus through a communication circuit such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
a display unit; and
a controller configured to:
preview a document page by page on the display unit;
extract a feature of an image of a page previewed on the display unit;
store the feature extracted from the image of the page previewed on the display unit;
extract a regularity from the stored features from the document;
automatically determine whether a feature of the image of the page being previewed on the display unit matches the regularity extracted; and
automatically display only a correction menu corresponding to the feature of the image of the page being previewed on the display unit which has been automatically determined to not match the regularity among a plurality of correction menus,
wherein the image processing apparatus further comprises a page change unit for changing a page to be previewed on the display unit, and
wherein when a page is not changed by the page change unit for a first period of time, the controller stores a feature of an image of the page previewed for the first period of time.

2. The image processing apparatus according to claim 1, wherein when a page is not changed by the page change unit for a second period of time, the controller displays a menu.

3. The image processing apparatus according to claim 1, wherein the controller displays a first symbol for changing a page to be previewed on the display unit to a next page, together with an image of a page previewed on the display unit, on the display unit, and when the first symbol is selected, the controller changes an image of a page to be previewed to a next page.

4. The image processing apparatus according to claim 1, wherein the controller is further configured to accept an approval of an image of a page previewed, wherein when an approval of an image is accepted by the controller, the controller stores a feature of the image of which approval is accepted.

5. The image processing apparatus according to claim 1, wherein the controller displays a second symbol for approving an image of a page previewed on the display unit, together with an image of a page previewed on the display unit, on the display unit, and when the second symbol is selected, the controller stores a feature of an image of a previewed page and changes an image to be previewed on the display unit to a next page.

6. The image processing apparatus according to claim 1, wherein the controller displays a menu for correcting a feature that does not agree, together with an image of a previewed page, on the display unit.

7. The image processing apparatus according to claim 1, wherein the controller stores a feature concerning a color of an image, and when the feature concerning a color of an image of a page previewed on the display unit does not agree with the regularity extracted by the controller, the controller displays a menu for correcting a color of an image.

8. The image processing apparatus according to claim 1, wherein the controller stores a feature concerning a page number given to an image, and when the feature concerning a page number given to an image of a page previewed on the display unit does not agree with the regularity extracted by the controller, the controller displays a menu for replacing pages.

9. The image processing apparatus according to claim 1, wherein the controller stores a feature concerning an orientation of an image, and when the feature concerning an orientation of an image of a page previewed on the display unit does not agree with the regularity extracted by the controller, the controller displays a menu for rotating an image.

10. The image processing apparatus according to claim 8, wherein the controller stores the feature concerning a page number given to an image or an orientation of an image, based on a character extracted from an image by optical character recognition.

11. The image processing apparatus according to claim 1, wherein the controller stores a feature concerning a density of an image, and when the feature concerning a density of an image of a page previewed on the display unit does not agree with the regularity extracted by the controller, the controller displays a menu for changing a density of an image.

12. The image processing apparatus according to claim 1, wherein when a feature of an image stored by the feature storage unit is consistent in all pages, the controller extracts a regularity.

13. The image processing apparatus according to claim 1, wherein when a feature of an image stored by the feature storage unit is consistent in every N pages (where N is a natural number), the controller extracts a regularity.

14. The image processing apparatus according to claim 1, wherein when a feature of an image stored by the feature storage unit is consistent in consecutive M pages (where M is a natural number), the controller extracts a regularity.

15. The image processing apparatus according to claim 1, wherein the feature storage unit stores a feature of an image by a numerical value, and the controller obtains a mean value A and a standard deviation s of numerical values stored by the feature storage unit, and extracts, as a regularity, that a feature of an image falls within a range of the mean value A±the standard deviation s×i (where i is a positive number).

16. An image processing apparatus, comprising:
a display unit; and
a controller configured to:
preview a document page by page on the display unit, wherein a page of the document to be previewed on the display unit is changeable by user;
extract a feature of an image of the page previewed on the display unit;
store the feature of the image of the page previewed on the display unit, wherein if the page is not changed for a first period of time, the feature of the image of the page previewed for the first period of time is stored;
extract a regularity from the features of the document; and
display a correction menu corresponding to the feature of the image of the page being previewed on the display unit which is determined to not match the regularity.

17. An image processing apparatus, comprising:
a display unit; and
a controller configured to:
preview a document page by page on the display unit;
extract a feature of an image of the page being previewed on the display unit;
store the feature extracted from the image of a page previewed on the display unit;
extract a regularity from the stored feature of the image; and
display a correction menu corresponding to the feature of the image of the page being previewed on the display unit which is determined to not match the regularity;
wherein the feature of the image is stored by a numerical value; and
wherein the controller is configured to obtain a mean value A and a standard deviation s of the numerical values, and to extract, as a regularity, that the feature of the image falls within a range of the mean value A±the standard deviation s×i (where i is a positive number).

18. An image processing apparatus comprising:
a display unit; and
a controller configured to:
preview a document page by page on the display unit;
extract a feature of an image of a page previewed on the display unit;
store the feature extracted from the image of the page previewed on the display unit;
extract a regularity from the stored features from the document;
automatically determine whether a feature of the image of the page being previewed on the display unit matches the regularity extracted; and
automatically display only a correction menu corresponding to the feature of the image of the page being previewed on the display unit which has been automatically determined to not match the regularity among a plurality of correction menus,
wherein the feature storage unit stores a feature of an image by a numerical value, and the controller obtains a mean value A and a standard deviation s of numerical values stored by the feature storage unit, and extracts, as a regularity, that a feature of an image falls within a range of the mean value A±the standard deviation s×i (where i is a positive number).

* * * * *